(12) United States Patent
Kim et al.

(10) Patent No.: US 12,360,569 B2
(45) Date of Patent: Jul. 15, 2025

(54) METHOD AND DEVICE FOR DISPLAYING CONTENT

(71) Applicant: Samsung Electronics Co., Ltd., Suwon-si (KR)

(72) Inventors: Joonhwan Kim, Suwon-si (KR); Seungwook Nam, Suwon-si (KR); Sooryuh Kim, Suwon-si (KR); Soryang Ban, Suwon-si (KR); Chansu Ahn, Suwon-si (KR); Seoyoung Yoon, Suwon-si (KR); Minkyung Lee, Suwon-si (KR); Jaemyoung Lee, Suwon-si (KR); Nayoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/671,298

(22) Filed: May 22, 2024

(65) Prior Publication Data
US 2024/0310879 A1  Sep. 19, 2024

Related U.S. Application Data

(63) Continuation of application No. PCT/KR2022/019529, filed on Dec. 2, 2022.

(30) Foreign Application Priority Data

Jan. 20, 2022 (KR) .......... 10-2022-0008378
Feb. 3, 2022 (KR) .......... 10-2022-0013956

(51) Int. Cl.
G09G 5/02 (2006.01)
G06F 1/16 (2006.01)
H04N 1/00 (2006.01)

(52) U.S. Cl.
CPC ....... *G06F 1/1652* (2013.01); *H04N 1/00503* (2013.01)

(58) Field of Classification Search
CPC .... G06F 1/1652; G06F 3/0481; G06F 3/0485; G06F 3/04886; H04N 1/00503
See application file for complete search history.

(56) References Cited

U.S. PATENT DOCUMENTS 6,956,591 B2  10/2005  Lundin et al.
8,930,847 B2 *  1/2015  Jeong .................. G06F 3/04886
                                         715/788

(Continued)

FOREIGN PATENT DOCUMENTS

CN  106055327 A  * 10/2016  .......... G06F 3/1423
KR  10-2017-0062327 A  6/2014

(Continued)

OTHER PUBLICATIONS

Oppp X 2021 Hands-on https://www.youtube.com/watch?v=iF-Hfzntue0.

(Continued)

*Primary Examiner* — Joe H Cheng
(74) *Attorney, Agent, or Firm* — Jefferson IP Law, LLP

(57) ABSTRACT

An electronic device is provided. The electronic device includes a display capable of changing the size of a display screen, memory which stores instructions executable by a computer, and a processor which accesses the memory and executes the instructions. The processor arranges at least one piece of first content in a first arrangement on the display screen of a first screen size, maintain the arrangement of the at least one piece of first content in the first arrangement on the display screen of a second screen size, on the basis of a size change of the display screen from the first screen size to the second screen size, and arrange at least one piece of second content to be outputted on the display screen of the (Continued)

second screen size in a second arrangement corresponding to the screen size, on the basis of detection of a first input which causes movement of an application screen on the display screen of the second screen size.

20 Claims, 19 Drawing Sheets

(56) References Cited

U.S. PATENT DOCUMENTS

| | | | |
|---|---|---|---|
| 9,696,880 B2 * | 7/2017 | Monnig | G06F 3/0484 |
| 10,963,016 B1 | 3/2021 | Oh et al. | |
| 2004/0207647 A1 | 10/2004 | Lundin et al. | |
| 2012/0320041 A1 * | 12/2012 | Tanaka | H04N 13/361 |
| | | | 345/419 |
| 2013/0234951 A1 | 9/2013 | Kim et al. | |
| 2015/0067469 A1 * | 3/2015 | Shuto | G06F 40/169 |
| | | | 715/232 |
| 2016/0033999 A1 | 2/2016 | Browning | |
| 2017/0154609 A1 | 6/2017 | Yoon et al. | |
| 2022/0197584 A1 * | 6/2022 | Zheng | G06F 3/04817 |
| 2023/0216948 A1 * | 7/2023 | Ahn | G06F 1/1694 |
| | | | 455/575.4 |
| 2023/0298245 A1 * | 9/2023 | Yu | G09G 3/035 |
| | | | 345/592 |

FOREIGN PATENT DOCUMENTS

| | | |
|---|---|---|
| KR | 10-2018-0020737 A | 2/2018 |
| KR | 10-2018-0031373 A | 3/2018 |
| KR | 10-2019-0101184 A | 8/2019 |
| KR | 10-2019-0141518 A | 12/2019 |
| KR | 10-2107134 B1 | 5/2020 |
| KR | 10-2254597 B1 | 5/2021 |
| KR | 10-2014-0147497 A | 12/2021 |
| KR | 10-2021-0146095 A | 12/2021 |
| WO | 2017/111192 A1 | 6/2017 |

OTHER PUBLICATIONS https://androidcommunity.com/oppo-x-2021-rollable-smartphone-hands-on-videosappear-20210222/

International Search Report dated Mar. 9, 2023, issued in International Patent Application No. PCT/KR2022/019529.

Extended European Search Report dated Feb. 4, 2025; European Search Report 22922350.8-1218 / 4411524 PCT/KR2022019529.

* cited by examiner

METHOD AND DEVICE FOR DISPLAYING CONTENT

CROSS-REFERENCE TO RELATED APPLICATION(S)

This application is a continuation application, claiming priority under § 365(c), of an International application No. PCT/KR2022/019529, filed on Dec. 2, 2022, which is based on and claims the benefit of a Korean patent application number 10-2022-0008378, filed on Jan. 20, 2022, in the Korean Intellectual Property Office, and of Korean patent application number 10-2022-0013956, filed on Feb. 3, 2022, in the Korean Intellectual Property Office, the disclosure of each of which is incorporated by reference herein in its entirety.

BACKGROUND

1. Field

The disclosure relates to technology for displaying content.

2. Description of Related Art

With the development of digital technology, various electronic devices capable of communication and personal information processing while moving, such as a mobile communication terminal, a personal digital assistant (PDA), an electronic notebook, smartphone, a tablet personal computer (PC), a wearable device, etc., are being released.

Electronic devices may provide various functions to a user, such as a social network service (SNS), the Internet, multimedia, photo and video capturing and execution, etc. In particular, electronic devices may display pieces of content of various types and sizes on a display in various ways to provide various functions. Electronic devices may display pieces of content of various types on a display, such as photo content, video content, text content, etc.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for displaying content.

Additional aspects will be set forth in part in the description which follows and, in part, will be apparent from the description, or may be learned by practice of the presented embodiments.

In accordance with an aspect of the disclosure, an electronic device is provided. The electronic device includes a display configured to change a size of a display screen, memory storing one or more computer programs, and one or more processors communicatively coupled to the display and the memory, wherein the one or more computer programs include computer-executable instructions that, when executed by the one or more processors, cause the electronic device to arrange at least one piece of first content in a first arrangement on the display screen of a first screen size, based on a size change of the display screen from the first screen size to a second screen size, maintain an arrangement of the at least one piece of first content in the first arrangement on the display screen of the second screen size, and arrange at least one piece of second content to be output on the display screen of the second screen size in a second arrangement corresponding to the second screen size, based on detecting a first input that causes movement of an application screen on the display screen of the second screen size.

In accordance with another aspect of the disclosure, method performed by an electronic device is provided. The method includes arranging at least one piece of first content in a first arrangement on a display screen of a first screen size, based on a size change of the display screen from the first screen size to a second screen size, maintaining an arrangement of the at least one piece of first content in the first arrangement on the display screen of the second screen size, and arranging at least one piece of second content to be output on the display screen of the second screen size in a second arrangement corresponding to the second screen size, based on detecting a first input that causes movement of an application screen on the display screen of the second screen size.

In accordance with another aspect of the disclosure, one or more non-transitory computer-readable storage media storing one or more computer programs including computer-executable instructions that, when executed by one or more processors of an electronic device, cause the electronic device to perform operations are provided. The operations include arranging at least one piece of first content in a first arrangement on a display screen of a first screen size, based on a size change of the display screen from the first screen size to a second screen size, maintaining an arrangement of the at least one piece of first content in the first arrangement on the display screen of the second screen size, and arranging at least one piece of second content to be output on the display screen of the second screen size in a second arrangement corresponding to the second screen size, based on detecting a first input that causes movement of an application screen on the display screen of the second screen size.

An electronic device according to an embodiment maintains an arrangement of first content in a first arrangement, which is an original arrangement, even when a size of a display screen is changed from a first screen size to a second screen size, so it is possible to prevent a user from changing the location of the user's gaze to reidentify existing content viewed by the user after the size of the display screen is changed.

An electronic device according to an embodiment helps the user's consecutive text reading by maintaining an arrangement of first content in a first arrangement until a first input is detected, by maintaining the arrangement of the first content to be output on a display screen in the first arrangement or changing the arrangement of the first content to a second arrangement corresponding to a second screen size, based on detecting the first input that causes movement of an application screen.

An electronic device according to an embodiment displays the form of content in one of a first form corresponding to a first display screen or a second form corresponding to a second display screen, based on a size change of a display screen.

An electronic device according to an embodiment provides a virtual keyboard suitable for a size of a display screen for a convenient text input of a user by outputting one of a virtual keyboard of a first type and a virtual keyboard of a second type according to the size of the display screen.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
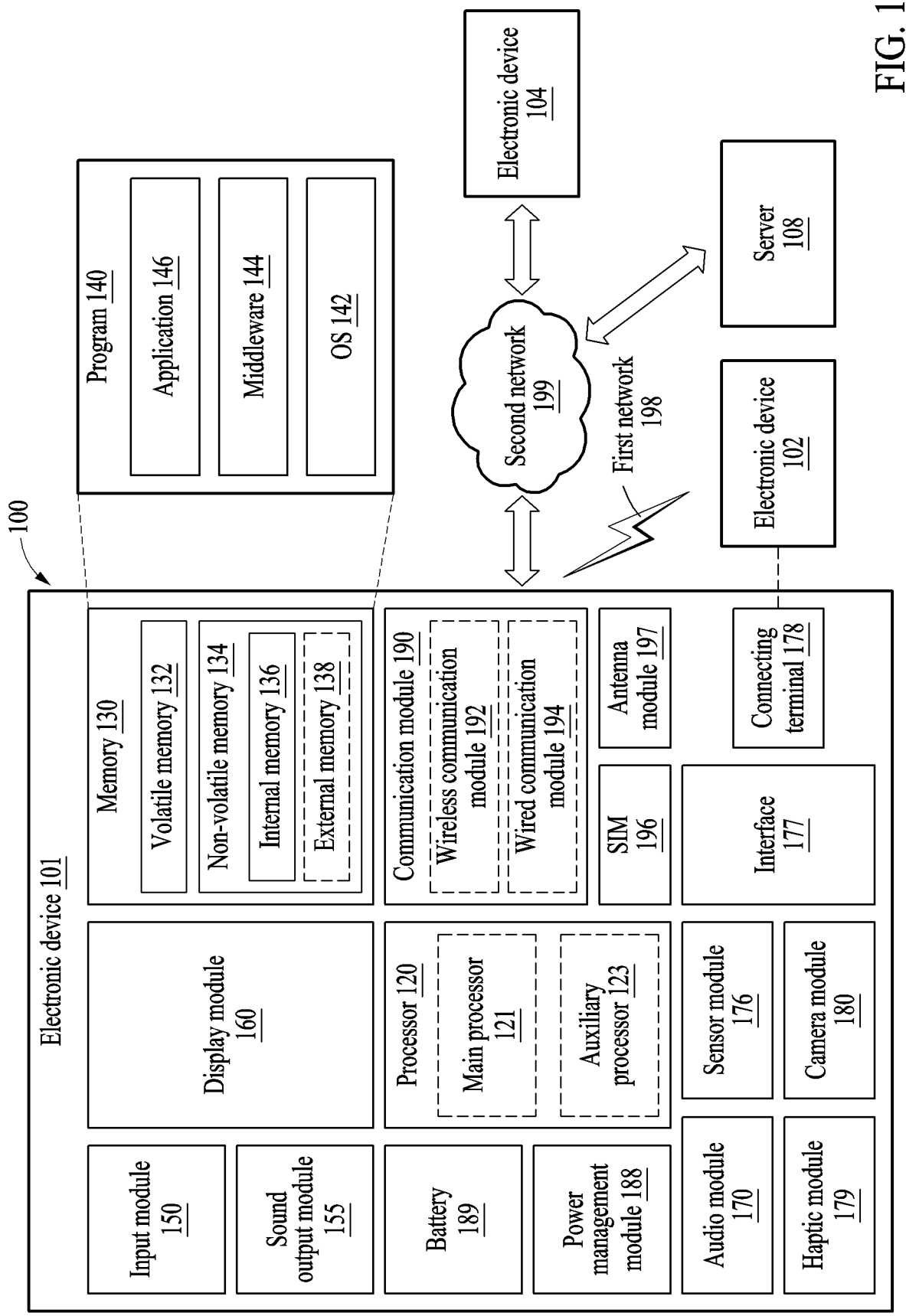
FIG. 1 is a block diagram of an electronic device in a network environment, according to an embodiment of the disclosure.

FIG. 1 is a block diagram of an electronic device 101 in a network environment 100, according to an embodiment of the disclosure.

Referring to FIG. 1, the electronic device 101 in the network environment 100 may communicate with an electronic device 102 via a first network 198 (e.g., a short-range wireless communication network), or communicate with at least one of an electronic device 104 and a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added to the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computations. According to an embodiment, as at least a part of data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. The non-volatile memory 134 may include an internal memory 136 and an external memory 138. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specifically for artificial intelligence model processing. An artificial intelligence model may be generated by machine learning. The machine learning may be performed by, for example, the electronic device 101, in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence (AI) model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from outside (e.g., a user) the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control its corresponding one of the display, the hologram device, and the projector. According to an embodiment, the display module 160 may include a touch sensor adapted to detect a touch, or a pressure sensor adapted to measure the intensity of force of the touch.

The audio module 170 may convert sound into an electric signal or vice versa. According to an embodiment, the audio module 170 may obtain the sound via the input module 150 or output the sound via the sound output module 155 or an external electronic device (e.g., the electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used by the electronic device 101 to couple with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may physically connect to an external electronic device (e.g., the electronic device 102). According to an embodiment, the connecting terminal 178 may include, for example, an HDMI connector, a USB connector, an SD card connector, or an audio connector (e.g., a headphones connector).

The haptic module 179 may convert an electric signal into a mechanical stimulus (e.g., a vibration or a movement) or an electrical stimulus, which may be recognized by a user via their tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, and flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device, for example, the electronic device 104, via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., an antenna array). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various embodiments, the antenna module 197 may form a mmWave antenna module. According to an embodiment, the mmWave antenna module may include a PCB, an RFIC on a first surface (e.g., the bottom surface) of the PCB, or adjacent to the first surface of the PCB and capable of supporting a designated high-frequency band (e.g., a mmWave band), and a plurality of antennas (e.g., array antennas) disposed on a second surface (e.g., the top or a side surface) of the PCB, or adjacent to the second surface of the PCB and capable of transmitting or receiving signals of the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device (e.g., the electronic device 104) via the server 108 coupled with the second network 199. Each of the external electronic devices (e.g., the electronic device 102 or 104) may be a device of the same type as or a different type from the electronic device 101. According to an embodiment, all or some of operations to be executed by the electronic device 101 may be executed by one or more external electronic devices (e.g., the electronic devices 102 and 104 and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or service. The one or more external electronic devices receiving the request may perform the at least part of the function or service, or an additional function or an additional service related to the request and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra-low-latency services using, e.g., distributed computing or MEC. In an embodiment, the external electronic device (e.g., the electronic device 104) may include an Internet-of-things (IoT) device. The server 108 may be an intelligent server using machine learning and/or a neural network. According to an embodiment, the external electronic device (e.g., the electronic device 104) or the server 108 may be included in the second network 199. The electronic device 101 may be applied to intelligent services (e.g., a smart home, a smart city, a smart car, or healthcare) based on 5G communication technology or IoT-related technology.

Figure 2A:
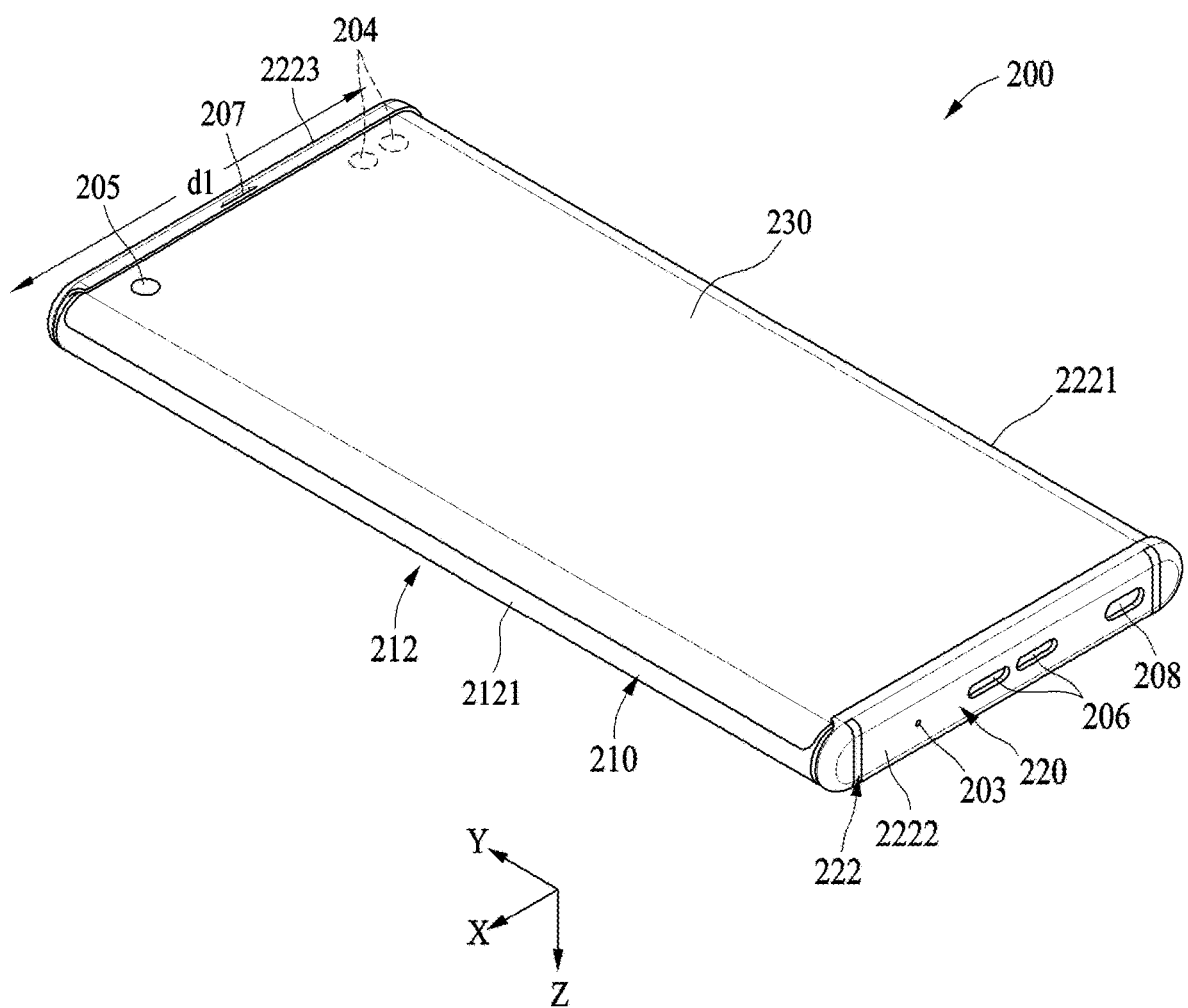
FIGS. 2A and 2B are front perspective views of an electronic device in a closed state and an open state, according to various embodiments of the disclosure.
Figure 2B:
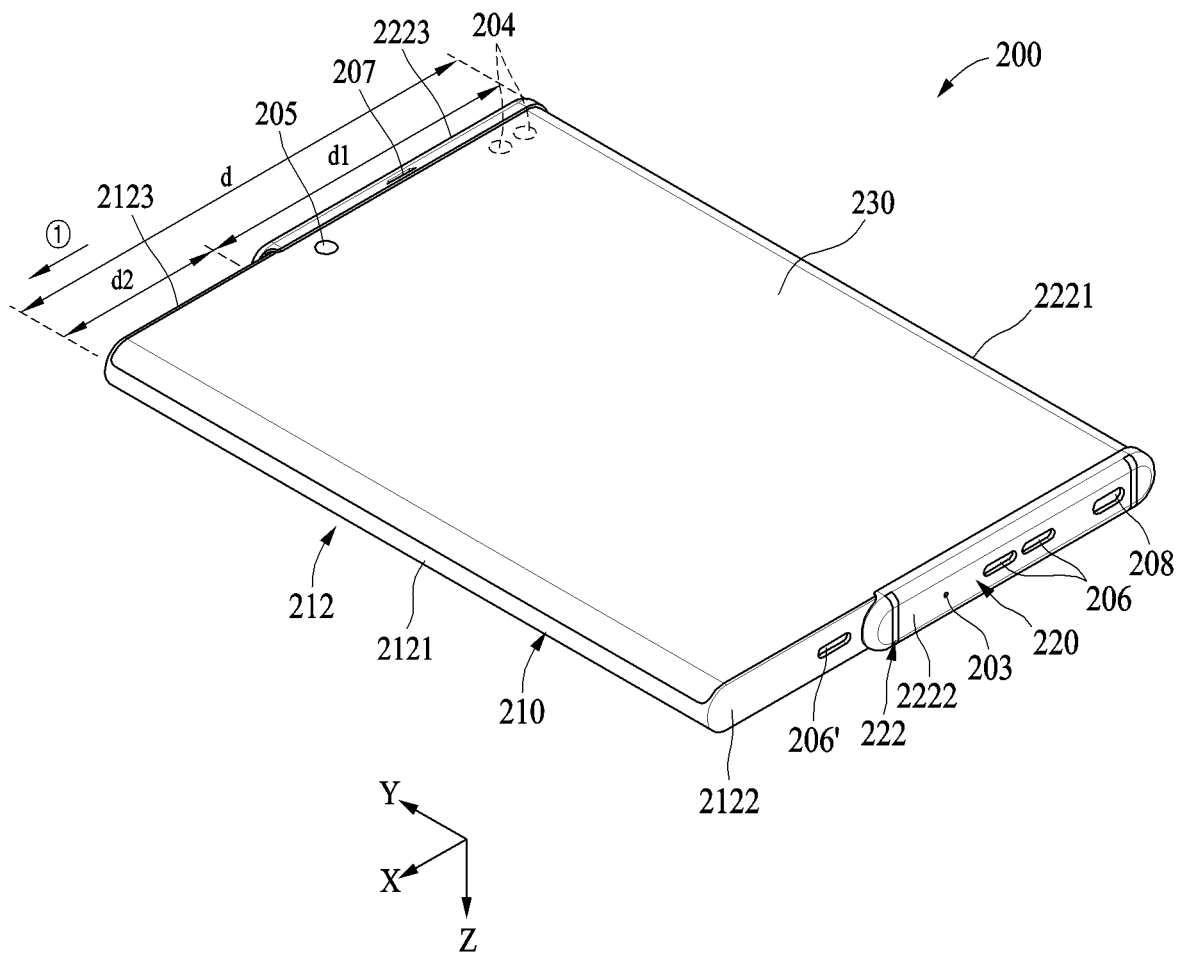

FIGS. 2A and 2B are front perspective views of an electronic device 200 in a closed state and an open state, according to various embodiments of the disclosure.

Figure 2C:
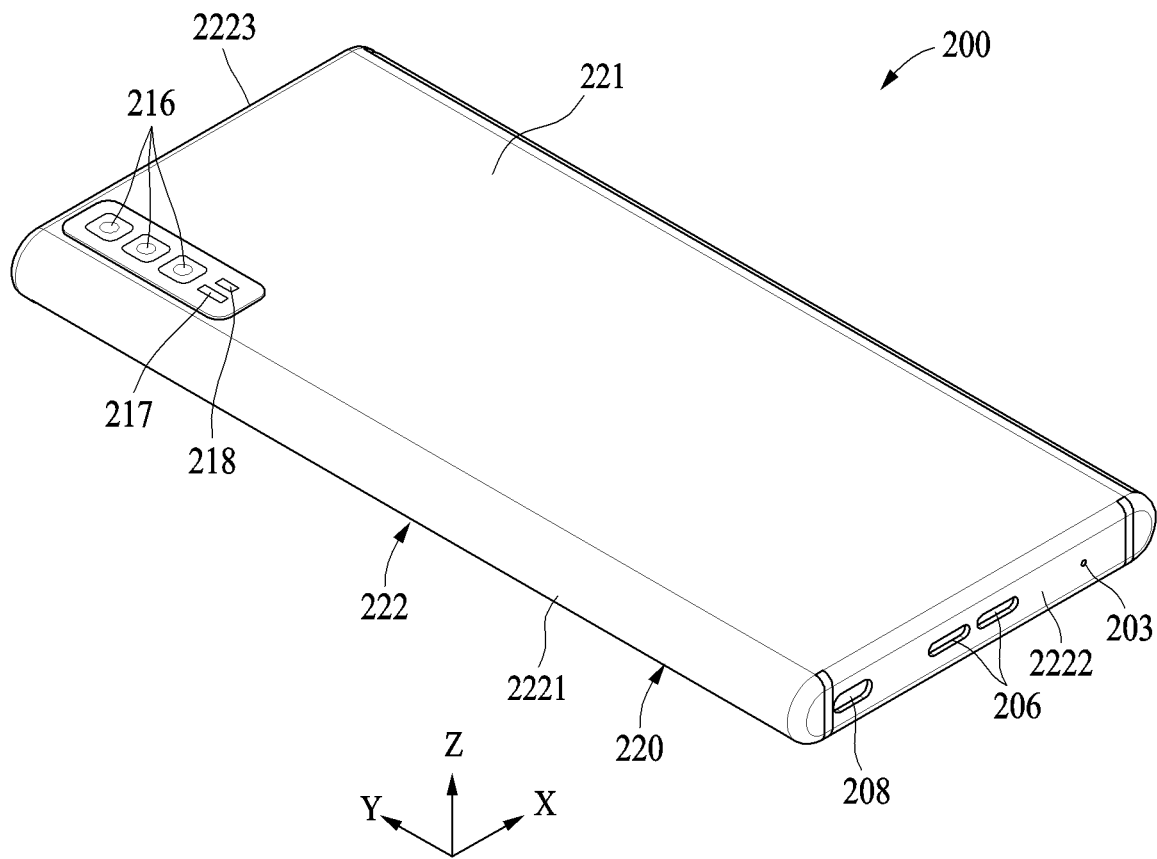
FIGS. 2C and 2D are rear perspective views of an electronic device in a closed state and an open state, according to various embodiments of the disclosure.
Figure 2D:
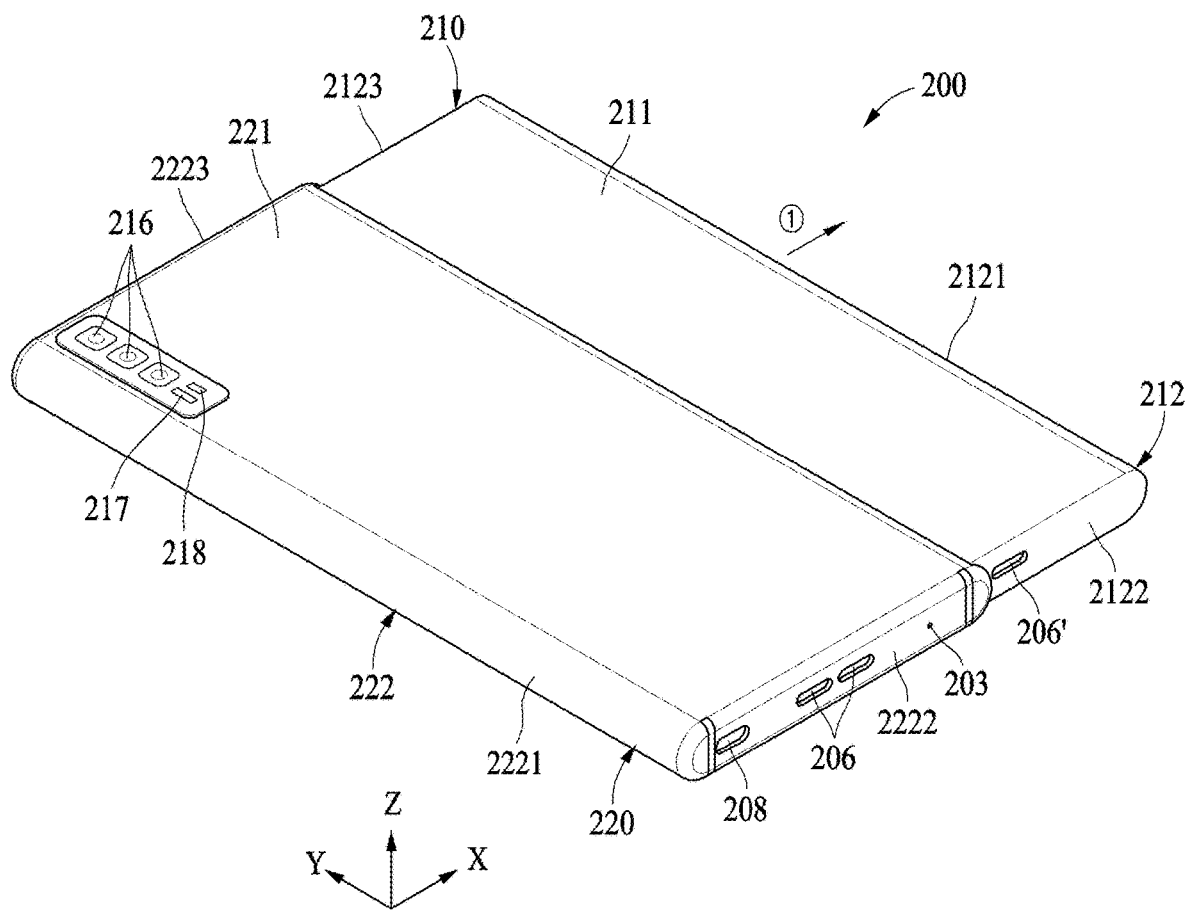

FIGS. 2C and 2D are rear perspective views of the electronic device 200 in a closed state and an open state, according to various embodiments of the disclosure.

The electronic device 200 of FIG. 2A may be at least partially similar to the electronic device 101 of FIG. 1 or may further include other embodiments of an electronic device.

Referring to FIGS. 2A, 2B, 2C, and 2D, the electronic device 200 may include a first housing 210 and a second housing 220 that is at least partially movably coupled to the first housing 210. According to an embodiment, the first housing 210 may include a first plate 211 and a first side frame 212 extending in a substantially vertical direction (e.g., a z-axis direction) along an edge of the first plate 211. According to an embodiment, the first side frame 212 may include a first side surface 2121, a second side surface 2122 extending from one end of the first side surface 2121, and a third side surface 2123 extending from the other end of the first side surface 2121. According to an embodiment, the first housing 210 may include a first space that is at least partially closed from the outside through the first plate 211 and the first side frame 212.

According to various embodiments, the second housing 220 may include a second plate 221 and a second side frame 222 extending in a substantially vertical direction (e.g., the z-axis direction) along an edge of the second plate 221. According to an embodiment, the second side frame 222 may include a fourth side surface 2221 facing away from the first side surface 2121, a fifth side surface 2222 extending from one end of the fourth side surface 2221 and at least partially coupled to the second side surface 2122, and a sixth side surface 2223 extending from the other end of the fourth side surface 2221 and at least partially coupled to the third side surface 2123. In another embodiment, the fourth side surface 2221 may extend from a structure other than the second plate 221 and may also be coupled to the second plate 221. According to an embodiment, the second housing 220 may include a second space that is at least partially closed from the outside through the second plate 221 and the second side frame 222. According to an embodiment, the first plate 211 and the second plate 221 may be arranged to form a rear surface of the electronic device 200 at least partially. For example, the first plate 211, the second plate 221, the first side frame 212, and the second side frame 222 may be formed of, for example, polymer, coated or colored glass, ceramic, metal (e.g., aluminum, stainless steel (STS), or magnesium), or combination of two or more of the above materials.

According to various embodiments, the electronic device 200 may include a flexible display 230 arranged to be supported by the first housing 210 and the second housing 220. According to an embodiment, the flexible display 230 may include a flat portion supported by the second housing 220, and a bendable portion extending from the flat portion and supported by the first housing 210. According to an embodiment, the bendable portion of the flexible display 230 may be arranged in the first space of the first housing 210 not to be exposed to the outside when the electronic device 200 is closed and may be exposed to the outside to extend from the flat portion while being supported by the first housing 210 when the electronic device 200 is open. Accordingly, the electronic device 200 may be a rollable electronic device in which a display screen of the flexible display 230 expands in response to an open operation according to movement of the first housing 210 from the second housing 220.

According to various embodiments, in the electronic device 200, the first housing 210 may be at least partially inserted into the second space of the second housing 220 and may be coupled to be movable in direction ①. For example, in the closed state, the electronic device 200 may be maintained in a state in which the first housing 210 and the second housing 220 are coupled such that a distance between the first side surface 2121 and the fourth side surface 2221 is a first distance d1. According to an embodiment, in the open state, the electronic device 200 may be maintained in a state in which the first housing 210 protrudes from the second housing 220 to have a second interval distance d in which the first side surface 2121 protrudes from the fourth side surface 2221 by a predetermined distance d2. According to an embodiment, the flexible display 230 may be supported by the first housing 210 and/or the second housing 220 such that both ends thereof have curved edges, in the open state.

According to various embodiments, the electronic device 200 may automatically transition between the open state and the closed state by a driving unit arranged in the first space and/or the second space. For example, a processor (e.g., the processor 120 of FIG. 1) of the electronic device 200 may be configured to control an operation of the first housing 210 using the driving unit when an event for a transition between the open state and the closed state of the electronic device 200 is detected. In another embodiment, the first housing 210 may manually protrude from the second housing 220 through a user's manipulation. In this case, the first housing 210 may protrude by a protrusion amount desired by the user, and thus, a screen of the flexible display 230 may vary to have various display areas. Accordingly, the processor (e.g., the processor 120 of FIG. 1) of the electronic device 200 may display an object in various ways corresponding to a display area corresponding to a predetermined protrusion amount of the first housing 210 and may control execution of an application program.

According to various embodiments, the electronic device 200 may include at least one of an input device 203, sound output devices 206 and 207, sensor modules 204 and 217, camera modules 205 and 216, a connector port 208, a key input device (not shown), or an indicator (not shown). In another embodiment, at least one of the components described above of the electronic device 200 may be omitted, or the electronic device 200 may further include other components.

According to various embodiments, the input device 203 may include a microphone 203. In an embodiment, the input device 203 may include a plurality of microphones 203 arranged to sense a direction of sound. The sound output devices 206 and 207 may include speakers 206 and 207. The speakers 206 and 207 may include an external speaker 206 and a phone call receiver 207. In another embodiment, in the closed state, when an external speaker 206' is arranged in the first housing 210, sound may be output through a speaker hole 206 formed in the second housing 220. According to an embodiment, the microphone 203 and the connector port 208 may also be formed to have substantially the same configuration. In another embodiment, the sound output devices 206 and 207 may include a speaker (e.g., a piezo speaker) that operates without a separate speaker hole 206.

According to various embodiments, the sensor modules 204 and 217 may generate an electrical signal or data value corresponding to an internal operating state of the electronic device 200 or an external environmental state. The sensor modules 204 and 217 may include, for example, a first sensor module 204 (e.g., a proximity sensor or illuminance sensor) arranged on a front surface of the second housing 220 and/or a second sensor module 217 (e.g., a heart rate monitoring (HRM) sensor) arranged on a rear surface of the second housing 220. According to an embodiment, the first sensor module 204 may be arranged below the flexible display 230 in the second housing 220. According to an embodiment, the first sensor module 204 may further include at least one of a proximity sensor, an illuminance sensor 204, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an IR sensor, a biometric sensor, a temperature sensor, or a humidity sensor.

According to various embodiments, the camera devices 205 and 216 may include a first camera device 205 arranged on the front surface of the second housing 220 of the electronic device 200 and a second camera device 216 arranged on the rear surface of the second housing 220. According to an embodiment, the electronic device 200 may include a flash 218 located near the second camera device 216. According to an embodiment, the camera devices 205 and 216 may include one or more lenses, an image sensor, and/or an ISP. According to an embodiment, the first camera device 205 may be arranged below the flexible display 230 and may be configured to capture an object through a portion of an active area of the flexible display 230. According to an embodiment, the flash 218 may include, for example, a light-emitting diode (LED) or xenon lamp. In an embodiment, two or more lenses (e.g., a wide-angle lens and telephoto lens) and image sensors may be arranged on one surface of the electronic device 200.

According to various embodiments, the electronic device 200 may include at least one antenna (not shown). According to an embodiment, the at least one antenna, for example, may wirelessly communicate with an external electronic device (e.g., the electronic device 104 of FIG. 1) or may wirelessly transmit and receive power required for charging. According to an embodiment, the antenna may include a legacy antenna, mmWave antenna, a near field communication (NFC) antenna, a wireless charging antenna, and/or a magnetic secure transmission (MST) antenna. In another embodiment, an antenna structure may be formed through at least a portion of the first side frame 212 and/or the second side frame 222, which are formed of metal.

Figure 3:
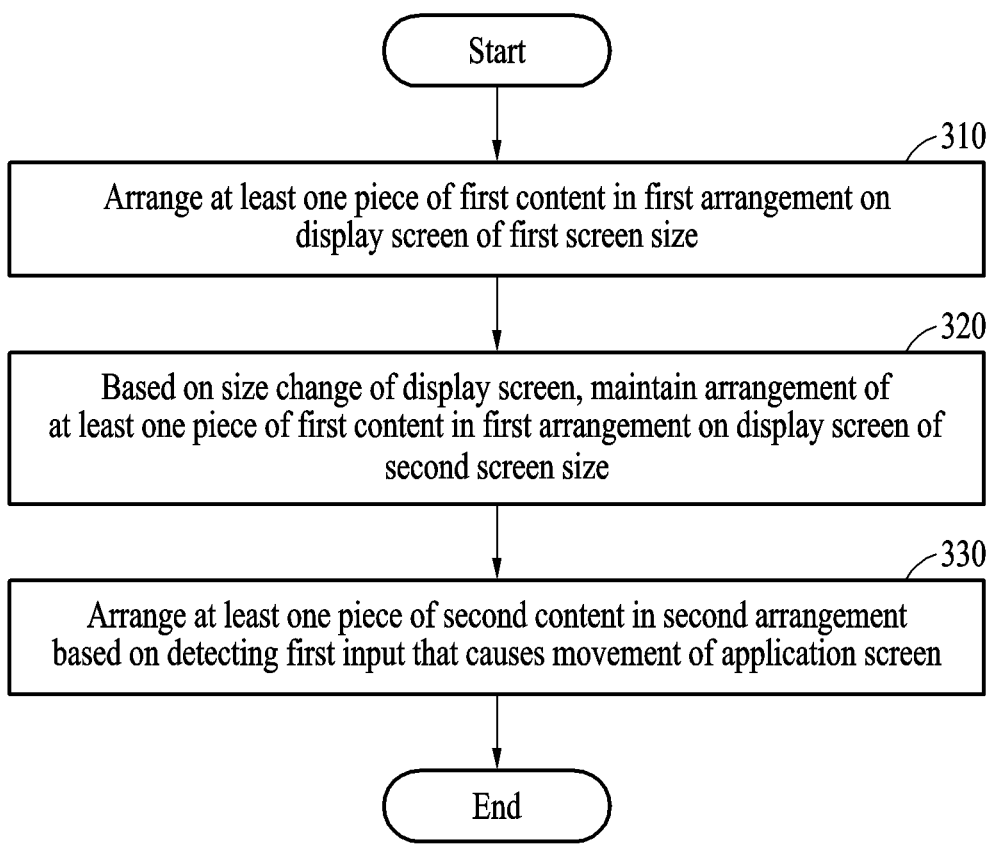
FIG. 3 is a flowchart illustrating an arrangement operation of content, according to an embodiment of the disclosure.

FIG. 3 is a flowchart illustrating an arrangement operation of content, according to an embodiment of the disclosure.

In operation 310, an electronic device (e.g., the electronic device 101 of FIG. 1) may arrange at least one piece of first content in a first arrangement on a display screen of a first screen size. The first screen size may represent a screen size before the display screen of the electronic device expands. The first arrangement is an arrangement corresponding to the first screen size and may represent an arrangement of content according to the first screen size. For example, first content may represent content to be output on the display screen at the time when the display screen begins to expand. The content may, for example, represent text, icons, images, etc.

In operation 320, based on a size change of the display screen from the first screen size to a second screen size, the electronic device may maintain an arrangement of the at least one piece of first content in the first arrangement on the display screen of the second screen size. For example, the electronic device (e.g., a rollable electronic device) having a flexible display may change a size of the display screen by expanding or reducing the display screen. The second screen size may represent a screen size after the display screen of the electronic device expands. For example, the second screen size may represent a size of the display screen when the display screen of the electronic device completely expands and may also represent a size of the display screen when the display screen of the electronic device partially expands.

In operation 330, the electronic device may arrange at least one piece of second content to be output on the display screen of the second screen size in a second arrangement corresponding to the second screen size, based on detecting a first input that causes movement of an application screen on the display screen of the second screen size. Second content is different from the first content and may represent content other than the first content to be newly output on the display screen as the application screen moves. The second arrangement corresponds to the second screen size and may represent an arrangement of content according to the second screen size. The electronic device may detect a user input (e.g., a scroll input, drag input, etc.) that causes the movement of the application screen. The electronic device may move the application screen by a distance according to the first input. As the application screen moves, the electronic device may change pieces of content to be output on the display screen. As the application screen moves, the electronic device may terminate an output of some pieces of first content of the at least one piece of first content output before the movement of the application screen and may maintain an output of the remaining pieces of first content.

Figure 4A:
FIGS. 4A, 4B, and 4C are diagrams illustrating an arrangement operation of text content, according to various embodiments of the disclosure.
Figure 4B:
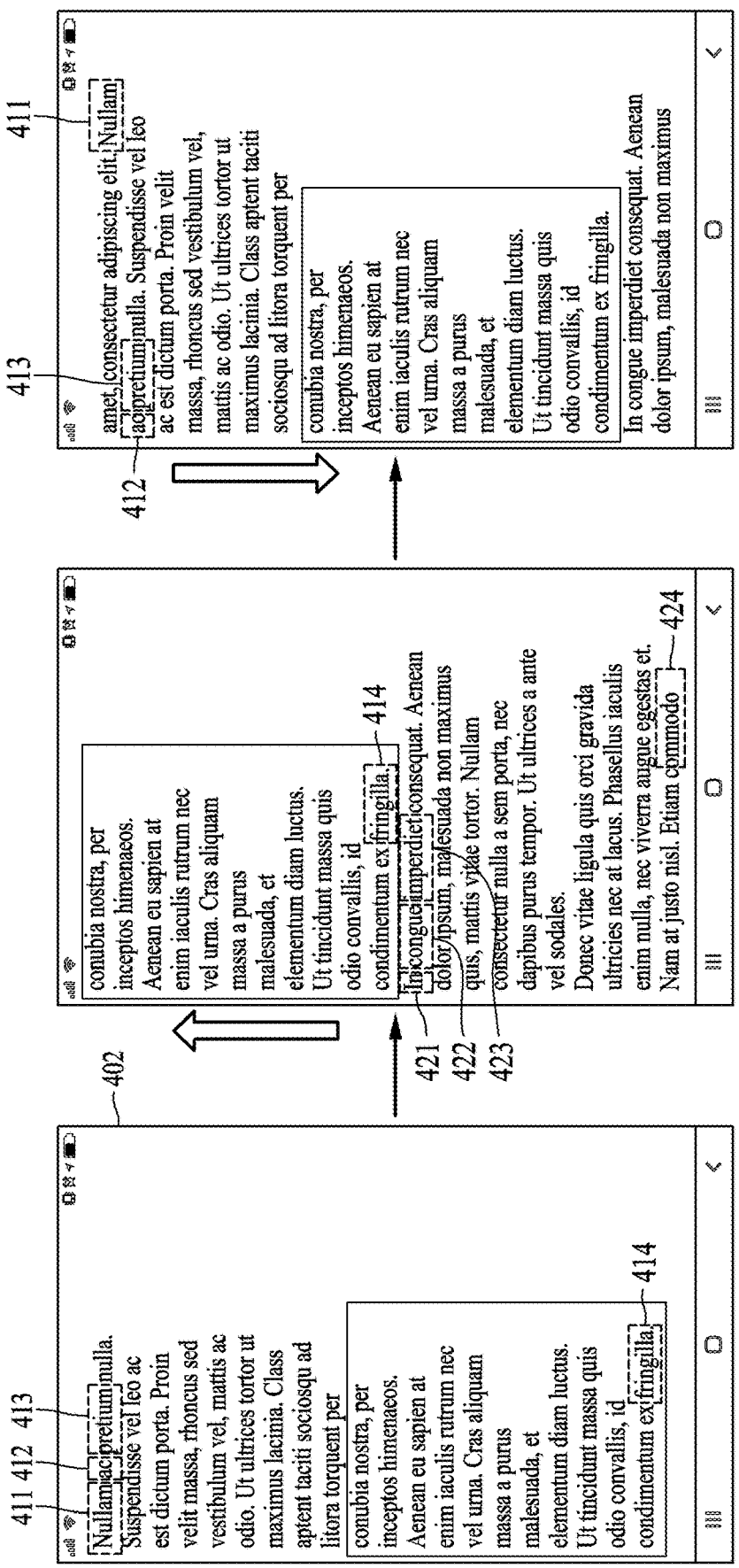
Figure 4C:
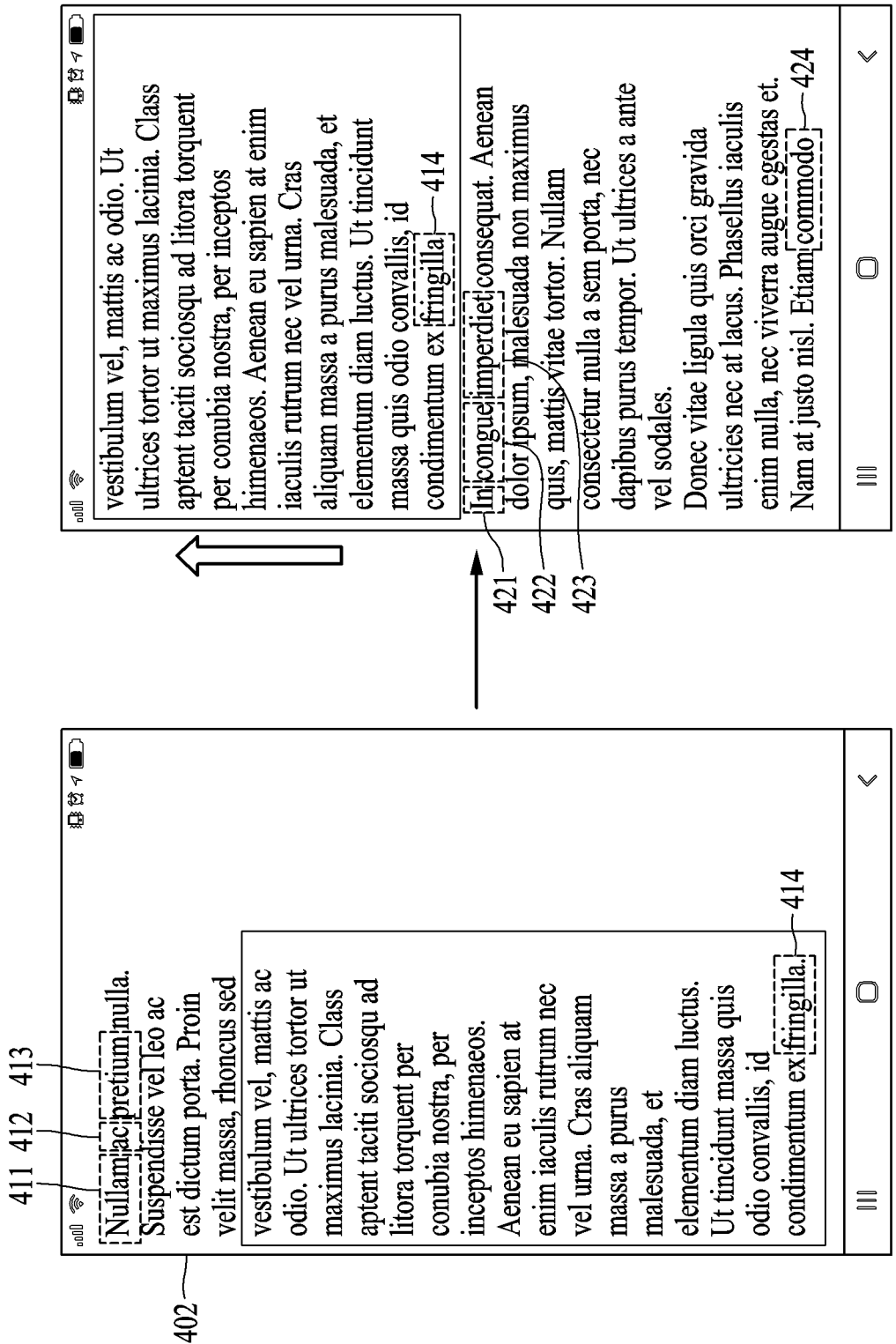

FIGS. 4A, 4B, and 4C are diagrams illustrating an arrangement operation of text content, according to various embodiments of the disclosure.

Referring to FIG. 4A, an electronic device 410 (e.g., the electronic device 101 of FIG. 1) according to an embodiment may arrange pieces of first content representing text content in a first arrangement on a display screen 401 of a first screen size. For example, the text content may correspond to one word but is not necessarily limited thereto, and the text content may correspond to one letter. Hereinafter, for ease of description, the text content is described as text corresponding to one word.

The electronic device 410 may maintain an arrangement of pieces of first content 411, 412, 413, . . . , 414 in the first arrangement on a display screen 402 of a second screen size, based on a size change of a display screen from the first screen size to the second screen size. For example, the electronic device 410 may block the reception of a user input that causes movement of an application while a size of the display screen changes. Accordingly, content, which is displayed on the display screen 402 of the second screen size at the time when the size change of the display screen to the second screen size of the electronic device 410 is terminated, may be the same as content displayed on the display screen 401 of the first screen size at the time when the size change of the display screen begins. The electronic device 410 may arrange the pieces of first content 411, 412, 413, . . . , 414 in the same arrangement as the first arrangement corresponding to the first screen size on the display screen 402 of the second screen size even when the size of the display screen changes.

The electronic device 410 may determine, according to the first screen size, a location where a line change is performed between the pieces of first content 411, 412, 413, . . . , 414 on the display screen 402 of the second screen size. That is, the electronic device 410 may maintain the location where the line change is performed between the pieces of first content 411, 412, 413, . . . , 414 in the same manner as in the display screen 401 of the first screen size.

Based on the size change of the display screen, the electronic device 410 may prevent a disconnection of the user's consecutive text reading by maintaining the arrangement of the at least one piece of first content representing the text content in the first arrangement on the display screen of the second screen size. Based on the size change of the display screen, when an arrangement of pieces of first content changes, as a location where the pieces of first content are displayed changes, the electronic device 410 may allow the user to change the location of the user's gaze, so the disconnection of the user's consecutive text reading may occur.

Referring to FIG. 4B, the electronic device 410 may arrange pieces of second content 421, 422, 423, . . . , 424 to be output on the display screen 402 of the second screen size in a second arrangement corresponding to the second screen size, based on detecting a first input that causes movement of an application screen on the display screen 402 of the second screen size. For example, the electronic device 410 may detect the first input and may move the application screen upwardly or downwardly on the display screen 402 of the second screen size. The electronic device 410 may move the application screen upwardly or downwardly by a distance according to the first input. The electronic device 410 may additionally output pieces of text content by the number of lines (e.g., five lines) corresponding to the distance according to the first input. The electronic device 410 may determine, according to the second screen size, a location where a line change is performed between the pieces of second content 421, 422, 423, . . . , 424 that are additionally output on the display screen 402 by the movement of the application screen.

The electronic device 410 may determine the pieces of second content 421, 422, 423, . . . , 424 output on the display screen 402 by the first input based on a display order of pieces of content. The display order of pieces of content (e.g., first content and second content) may be predetermined. The electronic device 410 may determine pieces of second content to be output on the display screen 402 of the second screen size after the application screen moves, by arranging the pieces of content in the second arrangement based on the display order of the pieces of content, starting from second content 421 of which the display order is closest to first content. For example, as shown in FIG. 4B, when the application screen is moved in the upward direction by the first input, second content of which the display order is closest to first content may represent the second content 421 having the display order after first content 414 of the last display order of the pieces of first content 411, 412, 413, . . . , 414. The electronic device 410 may determine pieces of second content to be displayed on the display screen 402 of the second screen size, by arranging pieces of content in the second arrangement until the pieces of content deviate from the display screen 402 of the second screen size in order of the display order, starting from the second content 421. In another example, when the application screen is moved in the downward direction by the first input, second content of which the display order is closest to first content may represent second content (not shown) having the display order before first content 411 of the first display order of the pieces of first content 411, 412, 413, . . . , 414. The electronic device 410 may determine pieces of second content to be output on the display screen 402 of the second screen size, by arranging the pieces of content in the second arrangement until the pieces of content deviate from the display screen 402 of the second screen size in reverse order of the display order, starting from second content (not shown).

According to an embodiment, the electronic device 410 may arrange the pieces of first content 411, 412, 413, . . . , 414 in one of the first arrangement and the second arrangement, based on detecting the first input that causes the movement of the application screen on the display screen 402 of the second screen size.

According to an embodiment, an electronic device may move pieces of first content while maintaining the pieces of first content in the first arrangement, based on detecting the first input. For example, as shown in FIG. 4B, the electronic device 410 may detect a scroll-up input, which moves the application screen upwardly from a user, as the first input. The electronic device 410 may move the pieces of first content 411, 412, 413, . . . , 414 upwardly while maintaining the arrangement in the first arrangement, based on detecting the first input. The electronic device 410 may terminate an output of some pieces of first content (e.g., pieces of first content 411, 412, and 413) of the pieces of first content 411, 412, 413, . . . , 414, which deviates from the display screen 402 of the second screen size by the movement of the application screen, based on detecting the first input. In contrast, the electronic device 410 may change and display a location of the remaining pieces of first content (e.g., the first content 414) of the pieces of first content 411, 412, 413, . . . , 414, which does not deviate from the display screen 402 of the second screen size by the movement of the application screen, on the display screen 402.

According to an embodiment, an electronic device may arrange and display some pieces of first content in the second arrangement when some pieces of first content that deviate from a display screen by the movement of the application screen return to the display screen by a second input. In the foregoing example, in the electronic device 410, pieces of first content (e.g., the pieces of first content 411, 412, and 413) may deviate from the display screen by the movement of the application screen according to the first input. The electronic device 410 may detect a scroll-down input, which moves the application screen downwardly from a user, as the second input. The electronic device 410 may arrange and display the pieces of first content (e.g., the pieces of first content 411, 412, and 413), which return to the display screen 402, in the second arrangement, based on detecting the second input.

According to an embodiment, an electronic device may change an arrangement of pieces of first content to the second arrangement, based on detecting the first input. For example, as shown in FIG. 4C, the electronic device 410 may detect a scroll-up input, which moves the application screen upwardly from a user, as the first input. The electronic device 410 may change the arrangement of the pieces of first content 411, 412, 413, . . . , 414 to the second arrangement, based on detecting the first input. For example, the electronic device 410, as the first input is detected, may change and display the arrangement of the pieces of first content 411, 412, 413, ..., 414 to the second arrangement at the time when at least one piece of second content is output on the display screen 402 of the second screen size. In another example, the electronic device 410, as the first input is detected, may change the arrangement of the pieces of first content 411, 412, 413, ..., 414 to the second arrangement at the time when the pieces of second content 421, 422, 423, ..., 424 are all output on the display screen 402 of the second screen size.

According to an embodiment, when the arrangement of the pieces of first content is changed to the second arrangement, an electronic device may determine pieces of first content to be output on a display screen of the second screen size after the application screen moves, by arranging the pieces of first content in the second arrangement based on the display order of pieces of content, starting from first content of which the display order is closest to second content. For example, referring to FIG. 4C, when the electronic device 410 moves the application screen upwardly, the first content of which the display order is closest to the second content may represent the first content 414 having the display order before the second content 421 of the first display order of the pieces of second content 421, 422, 423, ..., 424. The electronic device 410 may determine pieces of first content displayed until deviating from the display screen 402 of the second screen size to be pieces of first content to be output on the display screen 402 of the second screen size, by arranging the pieces of first content 411, 412, 413, ..., 414 in the second arrangement in reverse order of the display order, starting from the first content 414.

Figure 5A:
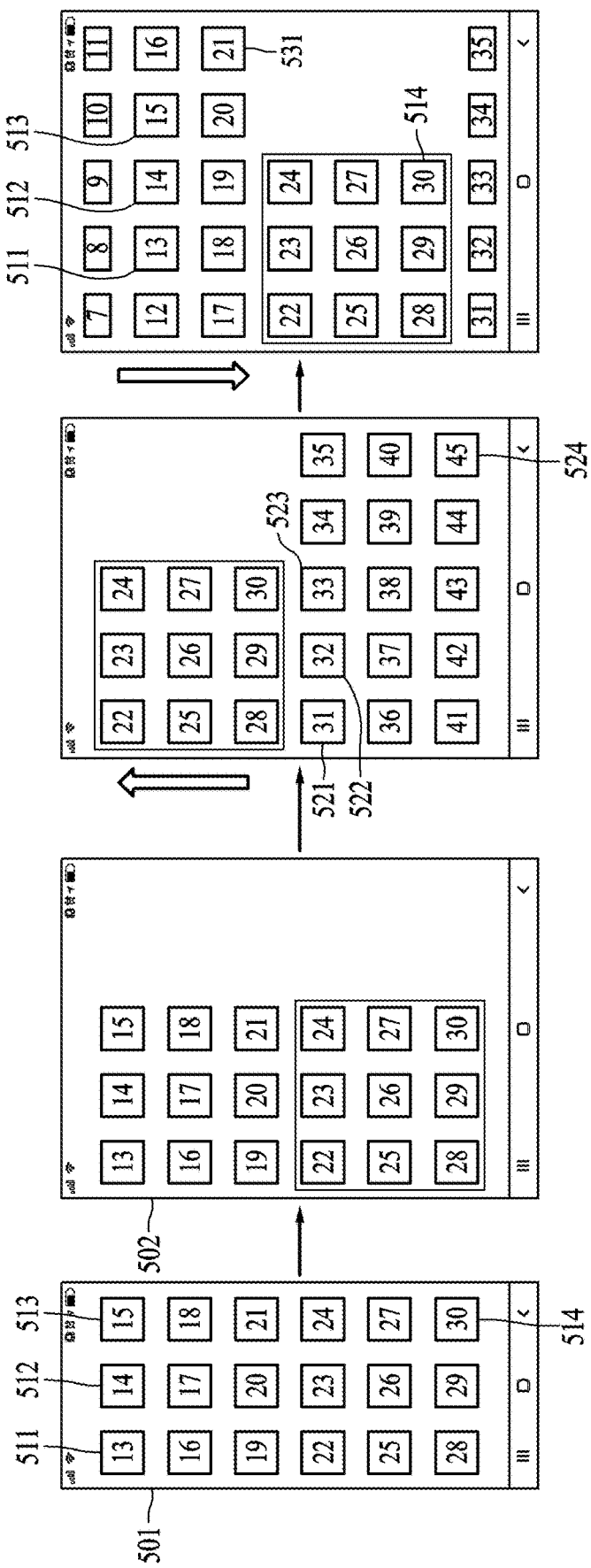
FIGS. 5A and 5B are diagrams illustrating an arrangement operation of image content, according to various embodiments of the disclosure.
Figure 5B:
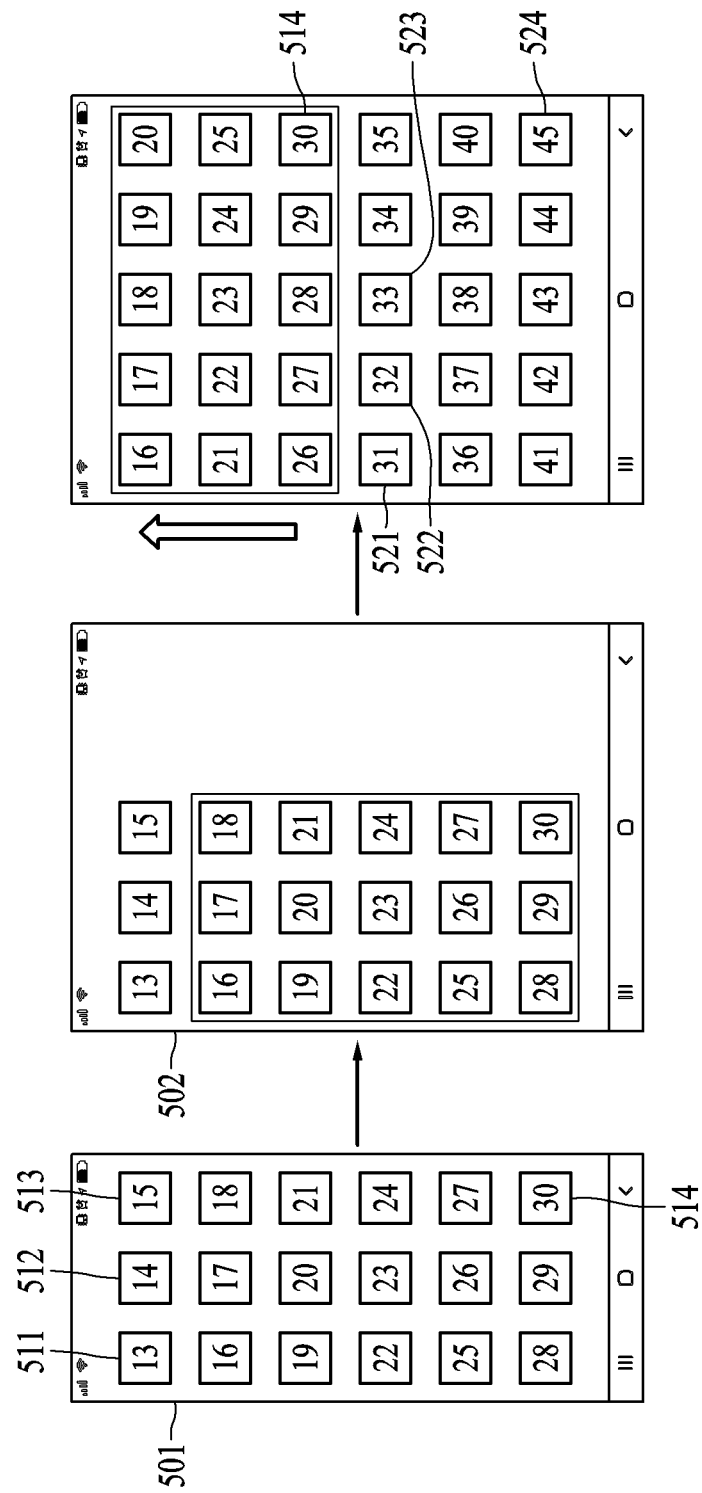

FIGS. 5A and 5B are diagrams illustrating an arrangement operation of image content, according to various embodiments of the disclosure.

An electronic device 510 (e.g., the electronic device 101 of FIG. 1) according to an embodiment may arrange pieces of first content 511, 512, 513, ..., 514 representing image content (e.g., thumbnail image content) in a first arrangement on a display screen 501 of a first screen size. For example, the first arrangement may represent an arrangement of three pieces of image content per line according to the first screen size, and a second arrangement may represent an arrangement of five pieces of image content per line according to a second screen size.

The electronic device 510 may maintain an arrangement of the pieces of first content 511, 512, 513, ..., 514 on a display screen 502 of the second screen size, based on a size change of a display screen from the first screen size to the second screen size. For example, the electronic device 510 may display the pieces of first content 511, 512, 513, ..., 514 on the display screen 502 of the second screen size by arranging three pieces of image content per line, based on the size change of the display screen. The electronic device 510 may display pieces of second content 521, 522, 523, ..., 524 to be output on the display screen 502 of the second screen size, by arranging five pieces of image content per line, based on detecting a first input that causes movement of an application screen.

Referring to FIG. 5A, the electronic device 510 may move the arrangement of the pieces of first content 511, 512, 513, ..., 514 upwardly while maintaining the arrangement in the first arrangement, based on detecting a scroll-up input, which moves the application screen upwardly, as the first input. The electronic device 510 may move the application screen by a distance according to the first input and may additionally display pieces of image content by the number of lines (e.g., three lines) corresponding to the distance according to the first input.

When the arrangement of pieces of first content moves upwardly while maintaining the arrangement in the first arrangement, the electronic device 510 may determine pieces of second content to be output on the display screen 502 of the second screen size after the application screen moves, by arranging pieces of image content in the second arrangement until the pieces of image content deviate from the display screen 502 of the second screen size in order of a display order of pieces of content, starting from second content 521 of which the display order is closest to first content. For example, the electronic device 510 may additionally display a total of 15 pieces of second content by additionally outputting five pieces of image content per line when pieces of image content are additionally output by three lines due to the movement of the application screen according to the first input.

The electronic device 510 may terminate an output of pieces of first content (e.g., pieces of first content 511, 512, and 513) by the number of lines (e.g., three lines) corresponding to the distance according to the first input when the arrangement of the pieces of first content 511, 512, 513, ..., 514 moves upwardly while maintaining the arrangement in the first arrangement. The electronic device 510 may display the pieces of first content by changing the arrangement of the pieces of first content returning to the display screen 502 to the second arrangement when the pieces of first content (e.g., the pieces of first content 511, 512, and 513) that deviate from the display screen 502 return to the display screen 502 of the second screen size by a second input. For example, the electronic device 510 may display the pieces of first content returning to the display screen 502 by arranging the pieces of first content in the second arrangement in reverse order of the display order, starting from first content 531 that is closest to pieces of first content not deviating from the display screen 502.

Referring to FIG. 5B, the electronic device 510 may change the arrangement of the pieces of first content 511, 512, 513, ..., 514 to the second arrangement, based on detecting the scroll-up input, which moves the application screen upwardly, as the first input. The electronic device 510 may additionally display the pieces of second content 521, 522, 523, ..., 524 by the number of lines (e.g., three lines) corresponding to the distance according to the first input. When the arrangement of pieces of first content is changed to the second arrangement based on detecting the first input that moves the application screen upwardly, the electronic device 510 may determine pieces of first content to be output on the display screen 502 of the second screen size after the application screen moves, by arranging pieces of image content in the second arrangement until the pieces of image content deviate from the display screen 502 of the second screen size in reverse order of the display order of pieces of content, starting from first content 514 of which the display order is closest to second content. For example, the electronic device 510 may output a total of 15 pieces of first content on the display screen 502 by displaying the pieces of first content in reverse order of the display order of pieces of content, starting from the first content 514, when the pieces of first content are displayed by three lines due to the movement of the application screen according to the first input.

Figure 6:
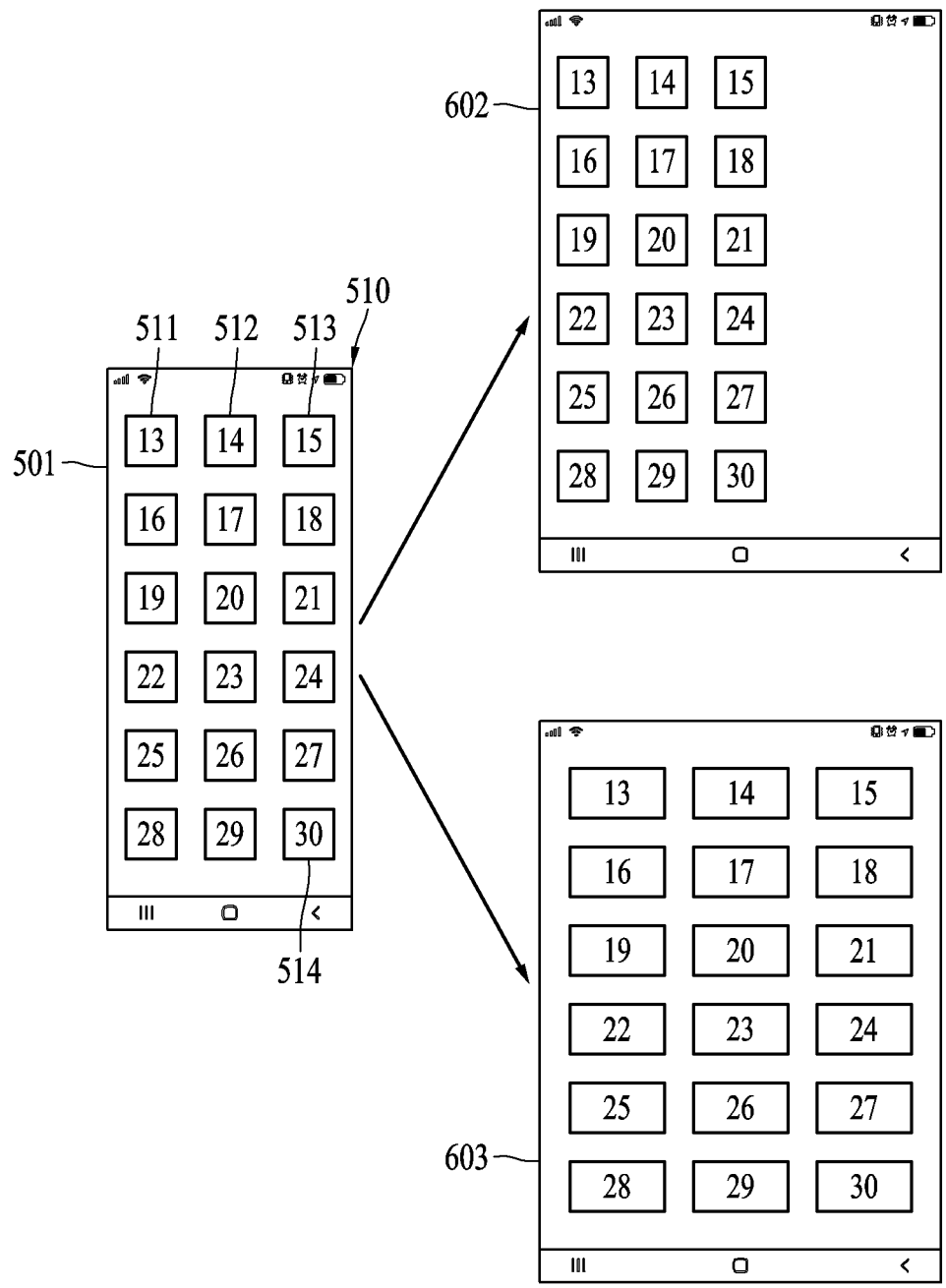
FIG. 6 is a diagram illustrating a form change of content, according to an embodiment of the disclosure.

FIG. 6 is a diagram illustrating a form change of content, according to an embodiment of the disclosure.

The electronic device 510 (e.g., the electronic device 101 of FIG. 1) according to an embodiment may maintain or change a form of each of the pieces of first content 511, 512, 513, ..., 514 on display screens 602 and 603 of a second screen size, based on a size change of a display screen from a first screen size to the second screen size.

According to an embodiment, the electronic device 510 may maintain, on a display screen 602 of the second screen size, the form of each of the pieces of first content 511, 512, 513, . . . , 514 in a first form that is the same as a form displayed on the display screen 501 of the first screen size, based on the size change of the display screen from the first screen size to the second screen size. For example, in the electronic device 510, image content may not be displayed on an expanded area of the display screen when the form of each of the pieces of first content 511, 512, 513, . . . , 514 is maintained in the first form.

According to another embodiment, the electronic device 510 may change and display the form of each of the pieces of first content 511, 512, 513, . . . , 514 to a second form corresponding to a display screen 603 of the second screen size on the display screen 603 of the second screen size, based on the size change of the display screen from the first screen size to the second screen size. The second form may correspond to a size of the second screen. More specifically, the second form may be a form in which each piece of first content is changed to display pieces of first content on a display screen of the second screen size in a balanced manner while maintaining an arrangement of the pieces of first content in a first arrangement. For example, as shown in FIG. 6, the second form may represent a form in which the length of a first axis of content expands by a predetermined length, and the length of a second axis of content is the same as a length before the size change of the display screen. Here, the first axis may be an axis parallel to a direction in which the display screen expands or is reduced, and the first axis may be an axis orthogonal to the second axis.

Figure 7A:
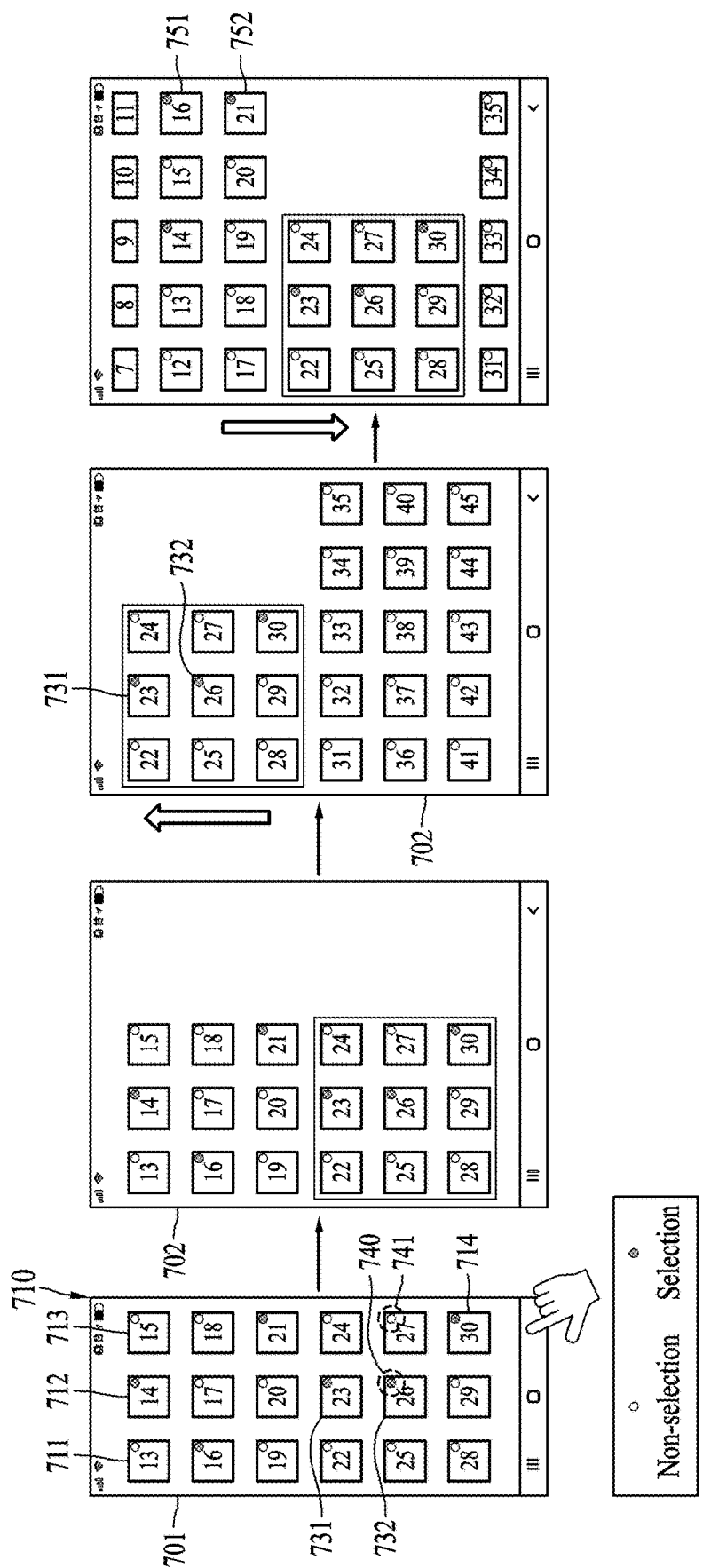
FIGS. 7A and 7B are diagrams illustrating an operation of maintaining content selection by a user, according to various embodiments of the disclosure.
Figure 7B:
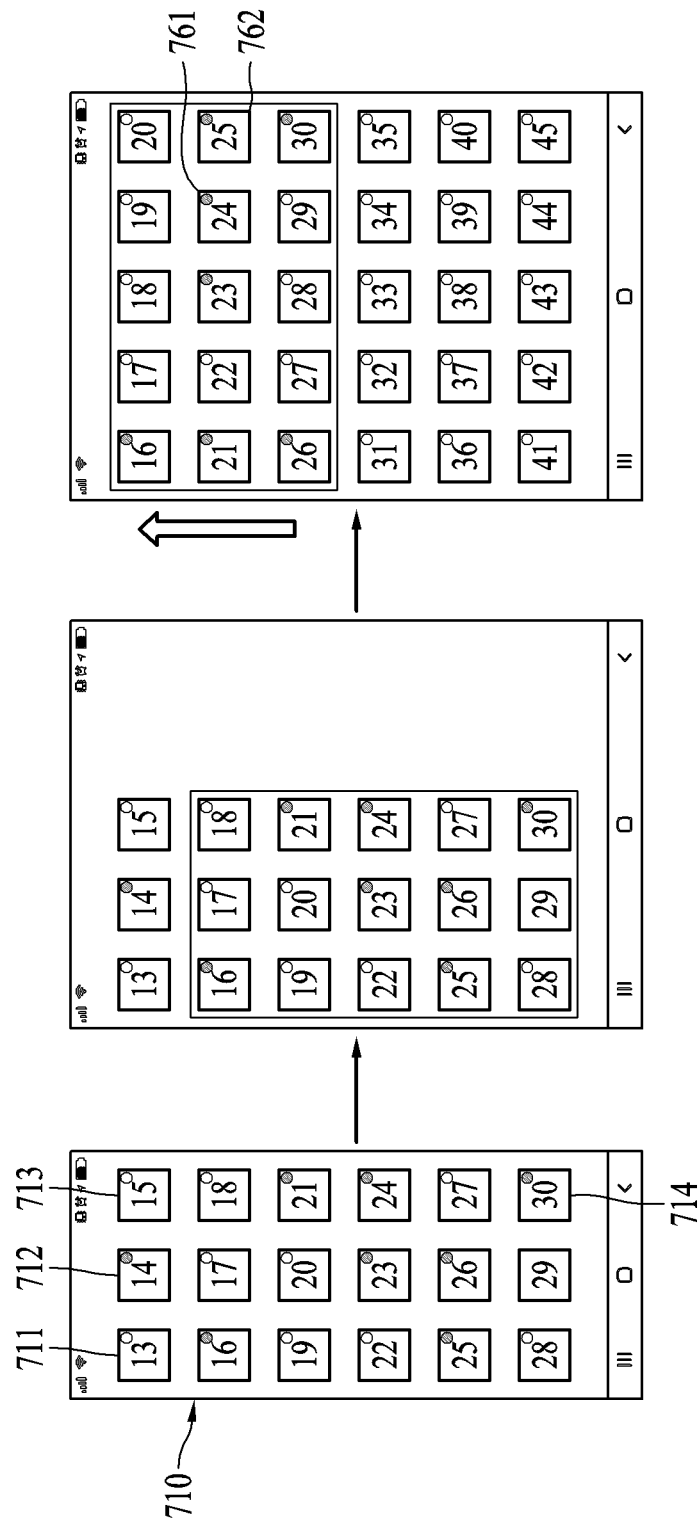

FIGS. 7A and 7B are diagrams illustrating an operation of maintaining content selection by a user, according to various embodiments of the disclosure.

An electronic device 710 (e.g., the electronic device 101 of FIG. 1) according to an embodiment may add a marking 740 representing selection made by a user for some pieces of first content (e.g., pieces of first content 731 and 732) of pieces of first content 711, 712, 713, . . . , 714 selected by the user. For example, the marking 740 added to each of pieces of first content selected by the user and a marking 741 added to each of pieces of first content not selected by the user may be distinguished from each other by the form, color, or size. According to an embodiment, the electronic device 710 may maintain a marking added to some pieces of first content selected by the user even after an application screen moves according to a first input. That is, the electronic device 710 may display the some pieces of first content while maintaining the marking 740 representing selection made by the user added to the some pieces of first content even when a location where the some pieces of first content selected by the user are output on a display screen is changed due to movement of the application screen according to the first input.

The electronic device 710 may receive a user input selecting some pieces of first content (e.g., the pieces of first content 731 and 732) of the pieces of first content (e.g., 711, 712, 713, . . . , 714) from a display screen 701 of a first screen size. The electronic device 710 may maintain an arrangement of the pieces of first content 711, 712, 713, . . . , 714 in a first arrangement when the size of a display screen is changed from the first screen size to a second screen size. The electronic device 710 may maintain the marking 740 added to the some pieces of first content (e.g., the pieces of first content 731 and 732) selected by the user even after the size of the display screen is changed.

Referring to FIG. 7A, the electronic device 710 may move the pieces of first content 711, 712, 713, . . . , 714 while maintaining the pieces of first content 711, 712, 713, . . . , 714 in the first arrangement, based on detecting the first input. The electronic device 710 may move the pieces of first content 711, 712, 713, . . . , 714 while maintaining the pieces of first content 711, 712, 713, . . . , 714 in the first arrangement as the application screen moves and may maintain the marking 740 added to the some pieces of first content selected by the user. For example, the electronic device 710 may display, among pieces of first content still output on a display screen 702 of the second screen size after the application screen moves according to the first input, the some pieces of first content (e.g., the pieces of first content 731 and 732) selected by the user on a changed location with the marking 740 added. Furthermore, the electronic device 710 may also display some pieces of first content (e.g., pieces of first content 751 and 752) of pieces of first content returned to the display screen 702 selected by the user with the marking 740 added when pieces of first content that deviate from the display screen 702 due to the movement of the application screen return to the display screen 702 of the second screen size by a second input. Referring to FIG. 7B illustrates an example of changing the arrangement of the pieces of first content 711, 712, 713, . . . , 714 to the second arrangement based on detecting the first input by the electronic device 710. The electronic device 710 may change the arrangement of the pieces of first content 711, 712, 713, . . . , 714 to the second arrangement according to the movement of the application screen and may display, among the pieces of first content still output on the display screen 702 of the second screen size after the application screen moves, some pieces of first content (e.g., pieces of first content 761 and 762) selected by the user on a changed location with the marking 740 added.

Figure 8A:
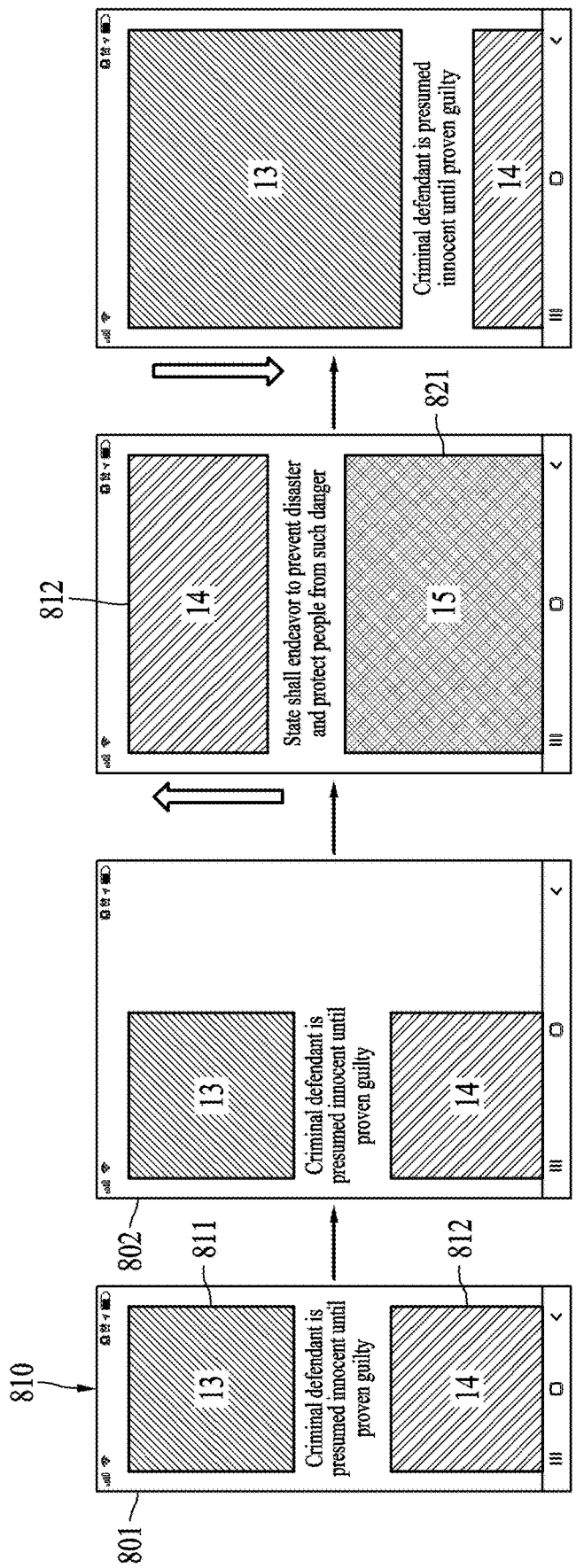
FIGS. 8A and 8B are diagrams illustrating a size change of content, according to various embodiments of the disclosure.
Figure 8B:
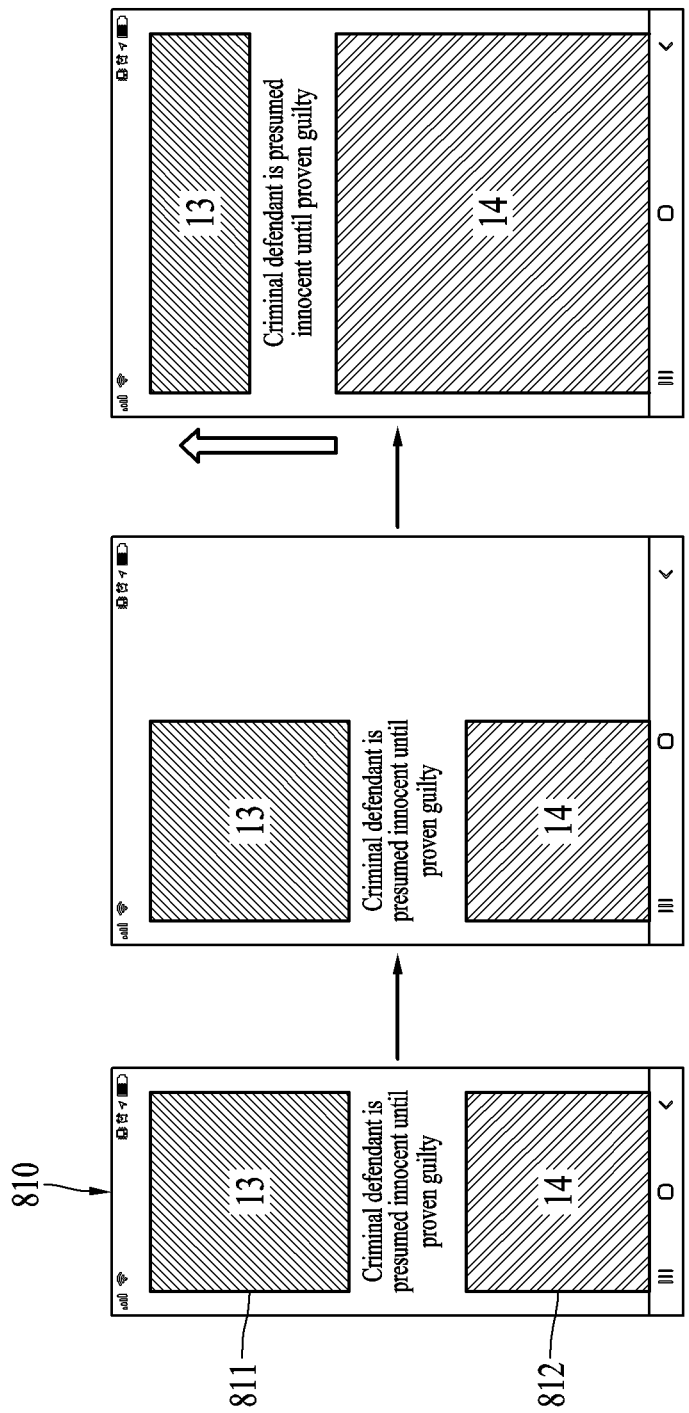

FIGS. 8A and 8B are diagrams illustrating a size change of content, according to various embodiments of the disclosure.

An electronic device 810 (e.g., the electronic device 101 of FIG. 1) according to an embodiment may change the size of content based on detecting a first input. The electronic device 810 may set a size of at least one piece of first content to one of a first size that is the same as a size displayed on a display screen of a first screen size or a second size corresponding to a second screen size, based on detecting the first input. The electronic device 810 may display at least one piece of second content in the second size corresponding to the second screen size. Here, the first size may represent a content size corresponding to the first screen size. For example, changing the size of content may represent increasing or decreasing the size while maintaining steadily a ratio of the length along a second axis to the length along a first axis of the content. As described above, the first axis may be an axis parallel to a direction in which a display screen expands, and the second axis may be an axis orthogonal to the first axis.

Referring to FIG. 8A, the electronic device 810 may display pieces of first content 811 and 812 representing image content in the first size corresponding to the first screen size on a display screen 801 of the first screen size. The electronic device 810 may maintain the size of the pieces of first content 811 and 812 displayed on a display screen 802 of the second screen size in the first size, based on a size change of a display screen from the first screen size to the second screen size. In addition, the electronic device

810 may detect the first input that causes movement of an application screen on the display screen 802 of the second screen size. The electronic device 810 may display second content 821 to be output on the display screen 802 of the second screen size in the second size, based on detecting the first input.

The electronic device 810 may move first content 811 while maintaining the size of the first content 811 in the first size, based on detecting a scroll-up input, which moves the application screen upwardly, as the first input. However, for first content 812 in which a portion of content is displayed on the display screen 802 before the application screen moves, the electronic device 810 may change and display the first content 812 to the second size when the remaining portion of the first content 812 is output on the display screen 802 as the application screen is moved by the first input. Furthermore, the electronic device 810 may change and display the size of the first content 811 to the second size when the first content 811 that deviates from the display screen 802 returns to the display screen 802 by the second input as the application screen moves.

Referring to FIG. 8B, the electronic device 810 may change the size of each of the pieces of first content 811 and 812 to the second size based on detecting the scroll-up input, which moves the application screen upwardly, as the first input. For example, the electronic device 810 may change the size of each of the pieces of first content 811 and 812 from the first size to the second size at the time when the first input is detected. In another example, the electronic device 810 may move the application screen according to detection of the first input and may change the size of the pieces of first content 811 and 812 to the second size at the time when the remaining portion of the first content 812 in which only a portion is displayed before the application screen moves is output or at the faster time when content other than first content is output.

Figure 9A:
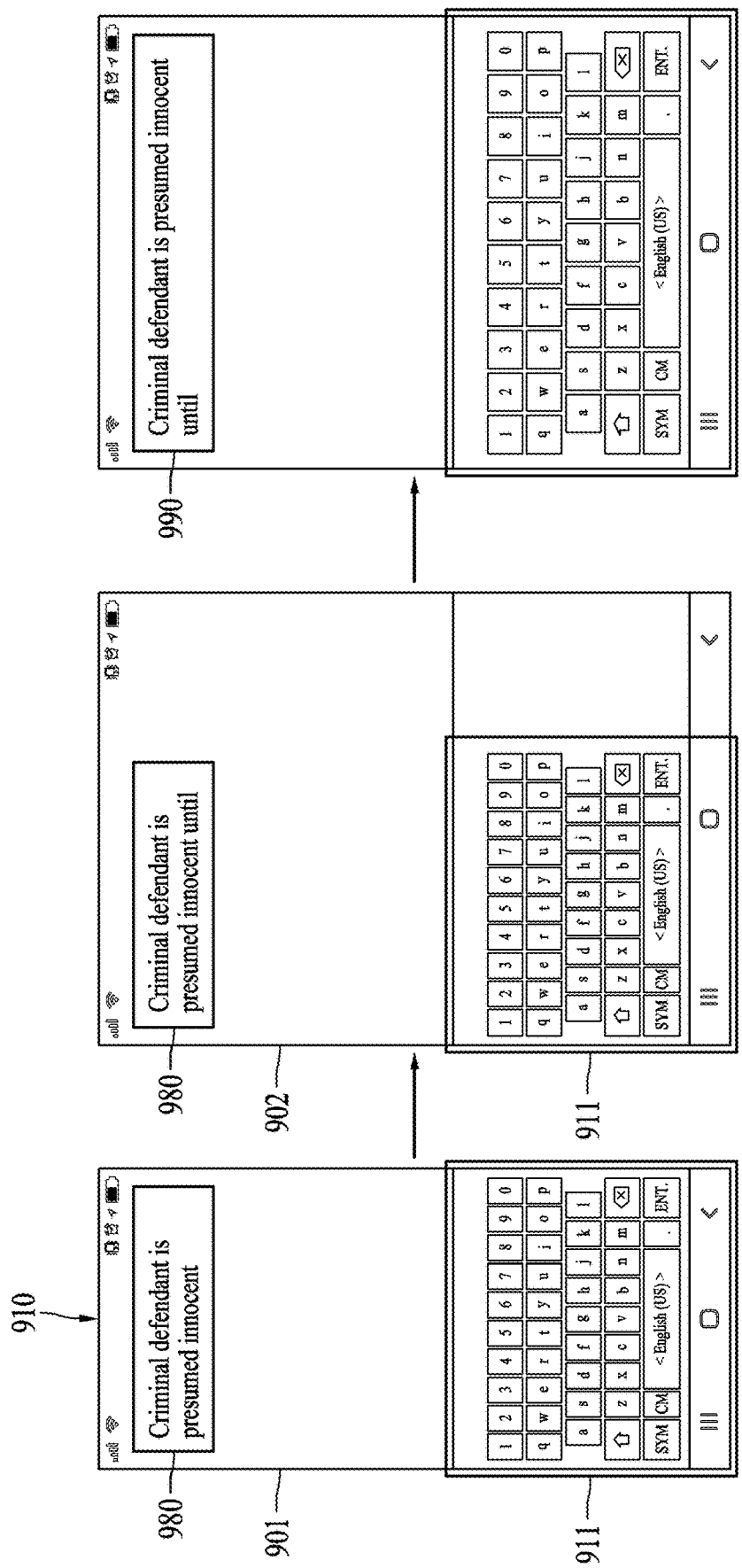
FIGS. 9A and 9B are diagrams illustrating a display operation of a virtual keyboard, according to various embodiments of the disclosure.
Figure 9B:
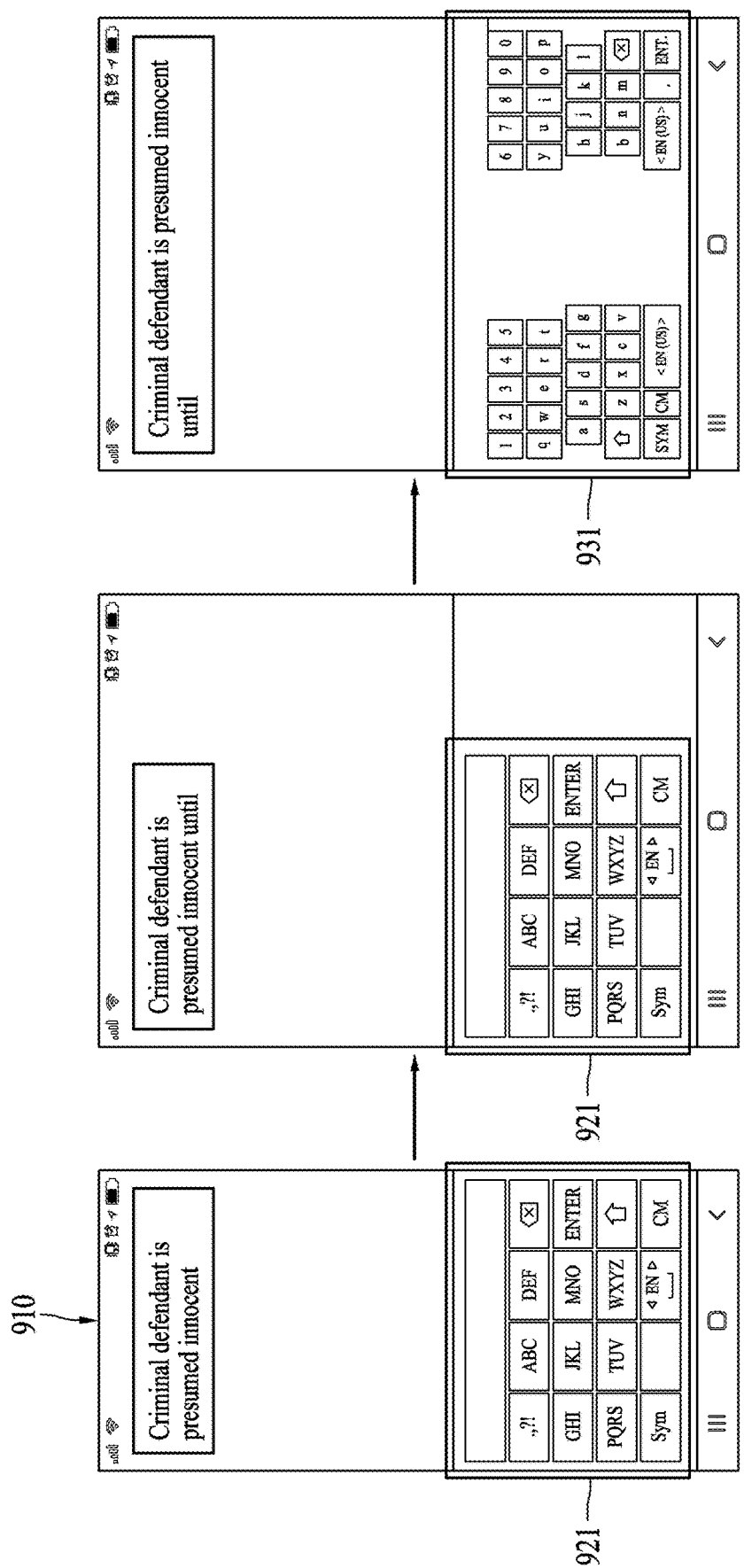

FIGS. 9A and 9B are diagrams illustrating a display operation of a virtual keyboard, according to various embodiments of the disclosure.

An electronic device 910 (e.g., the electronic device 101 of FIG. 1) according to an embodiment may output a virtual keyboard for a text input of a user. Referring to FIG. 9A, the electronic device 910 may output a virtual keyboard 911 of a first type on a display screen 901 of a first screen size. The screen size of a display screen of the electronic device 910 may be changed from the first screen size to a second screen size. According to an embodiment, the electronic device 910 may change the form of a virtual keyboard of a first type according to a display screen 902 of the second screen size, based on detecting the end of the text input of the user after a size change of a display screen from the first screen size to the second screen size is terminated.

Referring to FIG. 9A, the electronic device 910 may receive the text input of the user through the virtual keyboard 911 of the first type on the display screen 901 of the first screen size. When the text input of the user through the virtual keyboard 911 is received, the electronic device 910 may display text content corresponding to the text input on an area 980 of the display screen 901 of the first screen size. The electronic device 910 may arrange the text content corresponding to the text input of the user in a first arrangement. In addition, the size of the display screen of the electronic device 910 may be changed from the first screen size to the second screen size. When the size of the display screen is changed, the electronic device 910 may maintain and output the form and size of the virtual keyboard 911 of the first type and may maintain an arrangement of the text content corresponding to the text input in the first arrangement. In addition, the electronic device 910 may expand and output the virtual keyboard 911 of the first type to a first axis according to the display screen 902 of the second screen size, based on detecting the end of the text input of the user after the size change of the display screen from the first screen size to the second screen size is terminated. An electronic device 910 may determine that the text input is terminated in response to a case in which the text input of the user is not received for a predetermined amount of time. For example, the predetermined amount of time may be 2 seconds but is not limited thereto. In addition, the electronic device 910 may change the arrangement of the text content corresponding to the text input to the second arrangement, based on detecting the end of the text input of the user after the size change of the display screen from the first screen size to the second screen size is terminated. The electronic device 910 may display the text content in an area 990 of the display screen 902 of the second screen size. That is, the electronic device 910 may increase the size of an area in which the text content is displayed according to a second display screen when the size of the display screen is changed, and the text input of the user is terminated.

According to an embodiment, the electronic device 910 may terminate an output of a virtual keyboard of a first type based on detecting the end of the text input of the user after the size change of the display screen from the first screen size to the second screen size is terminated, and may output a virtual keyboard of a second type that is different from the virtual keyboard of the first type. The electronic device 910 may preset the type of virtual keyboard to be output for each screen size of the display screen. Referring to FIG. 9B, the electronic device 910 may be set to output a virtual keyboard 921 of a first type when the screen size of the display screen is less than a threshold size and may be set to output a virtual keyboard 931 of a second type when the screen size of the display screen is greater than or equal to the threshold size. For example, the electronic device 910 may terminate an output of the virtual keyboard 921 of the first type and may newly output the virtual keyboard 931 of the second type when it is determined that the screen size of the display screen is changed from the first screen size that is less than or equal to the threshold size to the second screen size that is greater than or equal to the threshold size, and the text input of the user is terminated. Furthermore, the electronic device 910 may change the arrangement of the text content corresponding to the text input to the second arrangement corresponding to the second screen size, based on detecting the end of the text input of the user after the size change of the display screen from the first screen size to the second screen size is terminated.

Figure 10:
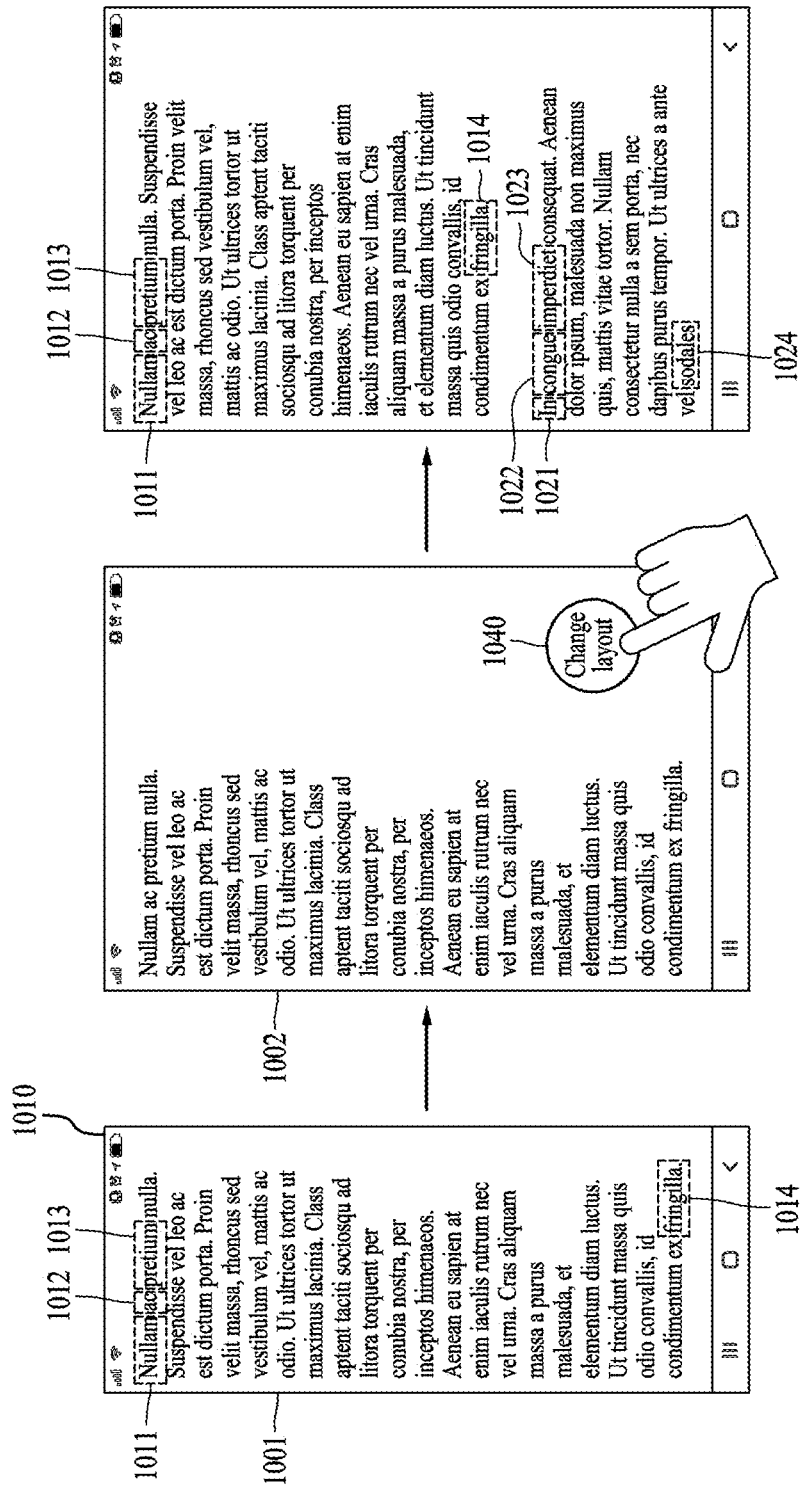
FIG. 10 is a diagram illustrating a change of an arrangement operation of content based on a user input, according to an embodiment of the disclosure.

FIG. 10 is a diagram illustrating a change of an arrangement operation of content based on a user input, according to an embodiment of the disclosure.

An electronic device 1010 (e.g., the electronic device 101 of FIG. 1) according to an embodiment may arrange both at least one piece of first content and at least one piece of second content in a second arrangement, based on a user input requesting an arrangement of content in the second arrangement is received after a size change of a display screen is terminated.

Referring to FIG. 10, the electronic device 1010 may arrange pieces of first content 1011, 1012, 1013, . . . , 1014 representing text content in a first arrangement on a display screen 1001 of a first screen size. The electronic device 1010 may maintain an arrangement of the pieces of first content 1011, 1012, 1013, . . . , 1014 in the first arrangement on a display screen 1002 of a second screen size, based on the size change of the display screen from the first screen size to the second screen size. The electronic device 1010 may output an object 1040 indicating an arrangement of content in the second arrangement on a display screen at the time when the size change of the display screen from the first screen size to the second screen size is terminated. For example, the electronic device 1010 may be set to output the object 1040 on the display screen 1002 of the second screen size for a predetermined amount of time. The electronic device 1010 may change the arrangement of the pieces of first content 1011, 1012, 1013, . . . , 1014 to the second arrangement in response to receiving the user input of selecting the object 1040. The electronic device 1010 may arrange the pieces of first content 1011, 1012, 1013, . . . , 1014 in the second arrangement in order of a display order, starting from first content 1011 of a first display order of the pieces of first content 1011, 1012, 1013, . . . , 1014. The electronic device 1010 may additionally output pieces of second content 1021, 1022, 1023, . . . , 1024 on the display screen 1002 of the second screen size. For example, the electronic device 1010 may determine pieces of second content to be output on the display screen 1002 of the second screen size, by arranging pieces of content in the second arrangement based on the display order of the pieces of content, starting from second content 1021 of which the display order is closest to first content. For example, the electronic device 1010 may determine the pieces of second content 1021, 1022, 1023, . . . , 1024 to be displayed on the display screen 1002 of the second screen size, by arranging the pieces of content in the second arrangement until the pieces of content deviate from the display screen 1002 of the second screen size in order of the display order, starting from the second content 1021.

According to an embodiment, the electronic device 1010 may determine whether to arrange at least one piece of first content and at least one piece of second content in the second arrangement, based on a history requested by the user to change and arrange content to the second arrangement. For example, the electronic device 1010 may output the object 1040 indicating the arrangement of the content in the second arrangement on a display screen and may arrange first content and second content in the second arrangement when the user input selecting the object 1040 is received. When a ratio of the number of times the user selects the object 1040 to the number of times the object 1040 is output is greater than or equal to a predetermined threshold ratio, the electronic device 1010 may automatically arrange both the first content and the second content in the second arrangement regardless of reception of the user input requesting the arrangement of the content in the second arrangement when the size change of the display screen from the first screen size to the second screen size is terminated. In the foregoing example, the electronic device 1010 may automatically arrange the first content and the second content in the second arrangement without an output of the object 1040 when the ratio of the number of times the user selects the object 1040 to the number of times the object 1040 is output is greater than or equal to the predetermined threshold ratio. Subsequently, the electronic device 1010 may also output again the object 1040 indicating the arrangement of the content in the second arrangement according to the user's setting. The electronic device 1010 may be set to arrange the content in the second arrangement only when the user input selecting the object 1040 is received regardless of the history requested by the user to change and arrange the content to the second arrangement, according to the user's setting.

An electronic device according to an embodiment may include a display configured to change a size of a display screen, memory storing one or more computer programs, and one or more processors communicatively coupled to the display and the memory, wherein the one or more computer programs include computer-executable instructions that, when executed by the one or more processors, cause the electronic device to arrange at least one piece of first content in a first arrangement on the display screen of a first screen size, based on a size change of the display screen from the first screen size to a second screen size, maintain an arrangement of the at least one piece of first content in the first arrangement on the display screen of the second screen size, and arrange at least one piece of second content to be output on the display screen of the second screen size in a second arrangement corresponding to the second screen size, based on detecting a first input that causes movement of an application screen on the display screen of the second screen size.

The one or more computer programs may further include computer-executable instructions that, when executed by the one or more processors, cause the electronic device to move the at least one piece of first content while maintaining the at least one piece of first content in the first arrangement, based on detecting the first input.

The one or more computer programs may further include computer-executable instructions that, when executed by the one or more processors, cause the electronic device to, based on detecting the first input, to terminate an output of first pieces of first content of the at least one piece of first content, which deviates from the display screen by the movement of the application screen, and arrange the first pieces of first content in the second arrangement when the first pieces of first content return to the display screen by a second input.

The one or more computer programs may further include computer-executable instructions that, when executed by the one or more processors, cause the electronic device to change the arrangement of the at least one piece of first content to the second arrangement based on detecting the first input.

The one or more computer programs may further include computer-executable instructions that, when executed by the one or more processors, cause the electronic device to determine first content to be output on the display screen after the application screen moves, by arranging the at least one piece of first content in the second arrangement based on a display order of pieces of content, starting from first content of which a display order is closest to second content.

The one or more computer programs may further include computer-executable instructions that, when executed by the one or more processors, cause the electronic device to maintain a form of the at least one piece of first content in a first form that is the same as a form displayed on the display screen of the first screen size, based on the size change of the display screen from the first screen size to the second screen size.

The one or more computer programs may further include computer-executable instructions that, when executed by the one or more processors, cause the electronic device to change and display the at least one piece of first content to a second form corresponding to the display screen of the second screen size, based on the size change of the display screen from the first screen size to the second screen size.

The one or more computer programs may further include computer-executable instructions that, when executed by the one or more processors, cause the electronic device to add a marking representing selection made by a user to first pieces of first content of the at least one piece of first content selected by the user and configured to maintain the marking added to the first selected pieces of first content, even after the application screen moves.

The one or more computer programs may further include computer-executable instructions that, when executed by the one or more processors, cause the electronic device to, based on detecting the first input, set a size of the at least one piece of first content to one of a first size that is the same as a size displayed on the display screen of the first screen size or a second size corresponding to the second screen size and display the at least one piece of second content in the second size corresponding to the second screen size.

The one or more computer programs may further include computer-executable instructions that, when executed by the one or more processors, cause the electronic device to output a virtual keyboard of a first type on the display screen of the first screen size, and change a form of the virtual keyboard of the first type according to the display screen of the second screen size or output a virtual keyboard of a second type that is different from the virtual keyboard of the first type, based on detecting an end of a text input of the user after the size change of the display screen from the first screen size to the second screen size is terminated.

The one or more computer programs may further include computer-executable instructions that, when executed by the one or more processors, cause the electronic device to arrange both the at least one piece of first content and the at least one piece of second content in the second arrangement, based on receiving a user input requesting an arrangement of content in the second arrangement after the size change of the display screen is terminated.

A method performed by an electronic device according to an embodiment may include arranging at least one piece of first content in a first arrangement on a display screen of a first screen size, based on a size change of the display screen from the first screen size to a second screen size, maintaining an arrangement of the at least one piece of first content in the first arrangement on the display screen of the second screen size, and arranging at least one piece of second content to be output on the display screen of the second screen size in a second arrangement corresponding to the second screen size, based on detecting a first input that causes movement of an application screen on the display screen of the second screen size.

The method according to an embodiment may further include moving the at least one piece of first content while maintaining the at least one piece of first content in the first arrangement, based on detecting the first input.

The method according to an embodiment may further include terminating an output of first pieces of first content of the at least one piece of first content, which deviates from the display screen by the movement of the application screen, and arranging the first pieces of first content in the second arrangement when the first pieces of first content return to the display screen by a second input.

The method according to an embodiment may further include changing the arrangement of the at least one piece of first content to the second arrangement based on detecting the first input.

The method according to an embodiment may further include determining the first content to be output on the display screen after the application screen moves, by arranging the at least one piece of first content in the second arrangement based on the display order of the content, starting from first content of which the display order is closest to second content.

The method according to an embodiment may further include maintaining a form of the at least one piece of first content in a first form that is the same as a form displayed on the display screen of the first screen size, based on the size change of the display screen from the first screen size to the second screen size.

The method according to an embodiment may further include changing and displaying the at least one piece of first content to a second form corresponding to the display screen of the second screen size, based on the size change of the display screen from the first screen size to the second screen size.

The according to an embodiment may include adding a marking representing selection made by a user to first pieces of first content of the at least one piece of first content selected by the user and maintaining the marking added to the first selected pieces of first content, even after the application screen moves.

The method according to an embodiment may further include, based on the detection of the first input, setting a size of the at least one piece of first content to one of a first size that is the same as a size displayed on the display screen of the first screen size or a second size corresponding to the second screen size and displaying the at least one piece of second content in the second size corresponding to the second screen size.

One or more non-transitory computer-readable storage media storing one or more computer programs including computer-executable instructions that, when executed by one or more processors of an electronic device, cause the electronic device to perform operations including arranging at least one piece of first content in a first arrangement on a display screen of a first screen size, based on a size change of the display screen from the first screen size to a second screen size, maintaining an arrangement of the at least one piece of first content in the first arrangement on the display screen of the second screen size, and arranging at least one piece of second content to be output on the display screen of the second screen size in a second arrangement corresponding to the second screen size, based on detecting a first input that causes movement of an application screen on the display screen of the second screen size.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display configured to change a size of a display screen;
memory storing one or more computer programs; and
one or more processors communicatively coupled to the display and the memory,
wherein the one or more computer programs include computer-executable instructions that, when executed by the one or more processors, cause the electronic device to:
arrange at least one piece of first content in a first arrangement on the display screen of a first screen size,
based on a size change of the display screen from the first screen size to a second screen size, maintain an arrangement of the at least one piece of first content in the first arrangement on the display screen of the second screen size, and arrange at least one piece of second content to be output on the display screen of the second screen size in a second arrangement corresponding to the second screen size, based on detecting a first input that causes movement of an application screen on the display screen of the second screen size.

2. The electronic device of claim 1, wherein the one or more computer programs further include computer-executable instructions that, when executed by the one or more processors, cause the electronic device to move the at least one piece of first content while maintaining the at least one piece of first content in the first arrangement, based on the detecting of the first input.

3. The electronic device of claim 1, wherein the one or more computer programs further include computer-executable instructions that, when executed by the one or more processors, cause the electronic device to, based on the detecting of the first input, terminate an output of first pieces of first content of the at least one piece of first content, which deviates from the display screen by the movement of the application screen, and arrange the first pieces of first content in the second arrangement when the first pieces of first content return to the display screen by a second input.

4. The electronic device of claim 1, wherein the one or more computer programs further include computer-executable instructions that, when executed by the one or more processors, cause the electronic device to change the arrangement of the at least one piece of first content to the second arrangement based on the detecting of the first input.

5. The electronic device of claim 1, wherein the one or more computer programs further include computer-executable instructions that, when executed by the one or more processors, cause the electronic device to determine first content to be output on the display screen after an application screen moves, by arranging the at least one piece of first content in the second arrangement based on a display order of pieces of content, starting from first content of which a display order is closest to second content.

6. The electronic device of claim 1, wherein the one or more computer programs further include computer-executable instructions that, when executed by the one or more processors, cause the electronic device to maintain a form of the at least one piece of first content in a first form that is the same as a form displayed on the display screen of the first screen size, based on the size change of the display screen from the first screen size to the second screen size.

7. The electronic device of claim 1, wherein the one or more computer programs further include computer-executable instructions that, when executed by the one or more processors, cause the electronic device to change and display the at least one piece of first content to a second form corresponding to the display screen of the second screen size, based on the size change of the display screen from the first screen size to the second screen size.

8. The electronic device of claim 1, wherein the one or more computer programs further include computer-executable instructions that, when executed by the one or more processors, cause the electronic device to add a marking representing selection made by a user to first pieces of first content of the at least one piece of first content selected by a user and configured to maintain the marking added to the selected first pieces of first content, even after the application screen moves.

9. The electronic device of claim 1, wherein the one or more computer programs further include computer-executable instructions that, when executed by the one or more processors, cause the electronic device to, based on the detecting of the first input, set a size of the at least one piece of first content to one of a first size that is the same as a size displayed on the display screen of the first screen size or a second size corresponding to the second screen size and display the at least one piece of second content in the second size corresponding to the second screen size.

10. The electronic device of claim 1, wherein the one or more computer programs further include computer-executable instructions that, when executed by the one or more processors, cause the electronic device to:

output a virtual keyboard of a first type on the display screen of the first screen size, and change a form of the virtual keyboard of the first type according to the display screen of the second screen size or output a virtual keyboard of a second type that is different from the virtual keyboard of the first type, based on detecting an end of a text input of a user after the size change of the display screen from the first screen size to the second screen size is terminated.

11. The electronic device of claim 1, wherein the one or more computer programs further include computer-executable instructions that, when executed by the one or more processors, cause the electronic device to arrange both the at least one piece of first content and the at least one piece of second content in the second arrangement, based on receiving a user input requesting an arrangement of content in the second arrangement after the size change of the display screen is terminated.

12. A method performed by an electronic device, the method comprising:

arranging at least one piece of first content in a first arrangement on a display screen of a first screen size;

based on a size change of the display screen from the first screen size to a second screen size, maintaining an arrangement of the at least one piece of first content in the first arrangement on the display screen of the second screen size; and arranging at least one piece of second content to be output on the display screen of the second screen size in a second arrangement corresponding to the second screen size, based on detecting a first input that causes movement of an application screen on the display screen of the second screen size.

13. The method of claim 12, further comprising:

moving the at least one piece of first content while maintaining the at least one piece of first content in the first arrangement, based on the detecting of the first input.

14. The method of claim 12, further comprising, based on the detecting of the first input:

terminating an output of first pieces of first content of the at least one piece of first content, which deviates from the display screen by the movement of the application screen; and arranging the first pieces of first content in the second arrangement when the first pieces of first content return to the display screen by a second input.

15. The method of claim 12, further comprising:

changing the arrangement of the at least one piece of first content to the second arrangement based on the detecting of the first input, wherein the changing of the arrangement of the at least one piece of first content to the second arrangement comprises determining first content to be output on the display screen after the application screen moves, by arranging the at least one piece of first content in the second arrangement based on a display order of pieces of content, starting from first content of which a display order is closest to second content.

16. The method of claim 12, further comprising:
maintaining a form of the at least one piece of first content in a first form that is the same as a form displayed on the display screen of the first screen size, based on the size change of the display screen from the first screen size to the second screen size.

17. The method of claim 12, further comprising:
changing and displaying the at least one piece of first content to a second form corresponding to the display screen of the second screen size, based on the size change of the display screen from the first screen size to the second screen size.

18. The method of claim 12, further comprising:
adding a marking representing selection made by a user to first pieces of first content of the at least one piece of first content selected by a user and configured to maintain the marking added to the selected first pieces of first content, even after the application screen moves.

19. One or more non-transitory computer-readable storage media storing one or more computer programs including computer-executable instructions that, when executed by one or more processors of an electronic device, cause the electronic device to perform operations, the operations comprising:
arranging at least one piece of first content in a first arrangement on a display screen of a first screen size;
based on a size change of the display screen from the first screen size to a second screen size, maintaining an arrangement of the at least one piece of first content in the first arrangement on the display screen of the second screen size; and
arranging at least one piece of second content to be output on the display screen of the second screen size in a second arrangement corresponding to the second screen size, based on detecting a first input that causes movement of an application screen on the display screen of the second screen size.

20. The one or more non-transitory computer-readable storage media of claim 19, the operations comprising:
moving the at least one piece of first content while maintaining the at least one piece of first content in the first arrangement, based on the detecting of the first input.

* * * * *